(12) United States Patent
Harper et al.

(10) Patent No.: US 12,164,751 B1
(45) Date of Patent: Dec. 10, 2024

(54) MACHINE-LEARNING-BASED SOFTWARE APPLICATION AND TOOL MENU

(71) Applicant: Soot, Inc., San Francisco, CA (US)

(72) Inventors: Jacob Avi Harper, Brooklyn, NY (US); Amol Kapoor, Basking Ridge, NJ (US); Igor Emilian Brodecki, Berlin (DE); Benjamin Siu Ming Chan, London (GB); Noa Eisenbach Chazan, Philadelphia, PA (US); Malone Min Chen, London (GB); Hunter John Larco, New York City, NY (US); Mary Nally, New York City, NY (US); Ganesh Ravichandran, Westbury, NY (US); Ilya Schulte, Oosterhout (NL); Thomas Rochus Schwaiger, Sintra (PT); Jochem Johannes Van Bruggen, Harich (NL)

(73) Assignee: Soot, Inc., San Francisco, CA (US)

( * ) Notice: Subject to any disclaimer, the term of this patent is extended or adjusted under 35 U.S.C. 154(b) by 0 days.

(21) Appl. No.: 18/412,049

(22) Filed: Jan. 12, 2024

(51) Int. Cl.
*G06F 3/0482* (2013.01)
*G06F 3/04883* (2022.01)

(52) U.S. Cl.
CPC ........ *G06F 3/0482* (2013.01); *G06F 3/04883* (2013.01)

(58) Field of Classification Search
CPC ............................ G06F 3/0482; G06F 3/04883
See application file for complete search history.

(56) References Cited

U.S. PATENT DOCUMENTS

| 6,456,305 | B1 | 9/2002 | Qureshi | |
|---|---|---|---|---|
| 10,855,625 | B1* | 12/2020 | Viswanathan | H04L 51/02 |
| 2009/0177962 | A1 | 7/2009 | Gusmorino | |
| 2015/0220833 | A1 | 8/2015 | Le | |
| 2016/0132234 | A1* | 5/2016 | Riscutia | G06F 3/0484 715/773 |
| 2016/0188173 | A1* | 6/2016 | Glover | G06F 16/951 707/706 |
| 2019/0236695 | A1* | 8/2019 | McKenna | G06F 21/577 |
| 2023/0085462 | A1* | 3/2023 | Yoon | G06F 16/148 715/835 |

OTHER PUBLICATIONS

Daniels et al. (Nov./Dec. 2010). "Interactive Vector Field Feature Identification" IEEE Transactions on Visualization and Computer Graphics 16(6):1560-1568.

Harper et al., U.S. Office Action dated Jun. 17, 2024, directed to U.S. Appl. No. 18/412,036; 18 pages.

\* cited by examiner

*Primary Examiner* — Seth A Silverman
(74) *Attorney, Agent, or Firm* — Morrison & Foerster LLP

(57) ABSTRACT

A method for organizing a plurality of selectable software applications and tools may comprise receiving the plurality of selectable software applications and tools, acquiring, for each software application or tool of the plurality of selectable software applications and tools, one or more representative digital objects associated with the respective software application or tool, generating a plurality of embeddings by providing, for each software application or tool, the corresponding one or more representative digital objects to a trained machine learning model, generating a visual layout of the plurality of selectable software applications and tools based on the plurality of embeddings, and displaying the plurality selectable software applications and tools in accordance with the visual layout.

20 Claims, 22 Drawing Sheets

MACHINE-LEARNING-BASED SOFTWARE APPLICATION AND TOOL MENU

FIELD

The present disclosure relates generally to software tool and application menus, and particularly relates to techniques for visually organizing software tool and application menus.

BACKGROUND

Software tool menus allow users to view, browse, and select software tools and applications for use in various software ecosystems. An operating system may provide a graphical user interface for displaying software applications (e.g., a word processor, a web browser) available for user access in the operating system. Further, a software application may provide tools. For example, a word processor software application can provide a graphical user interface for displaying tools such as tools for customizing the font or layout of word documents, while a social media software application can provide a graphical user interface for displaying tools for uploading images or posting status updates.

Typically, such tool menus are static and inflexible. Menus provided by an operating system may only show software applications, while menus provided by a software application may only show application-specific tools. The menus may be displayed as long or nested lists that are challenging to navigate. Related tools and applications may not be grouped together automatically. Customization options may be limited and, where available, may be limited to manual customization or restricted automatic customization that may only occur in certain limited, unnuanced contexts. Sharing customized menus with other users may not be possible, which may be a hinderance to users who wish to create repeatable experiences within a software environment.

SUMMARY

Described are techniques for providing a menu of selectable software tools and applications that leverage trained machine learning models to structure the menu. The disclosed methods may utilize embeddings of the software applications and tools to visually organize the applications and tools. For example, embeddings of the software applications and tools may be used to arrange the software applications and tools such that related applications and tools are grouped closely together. This may allow menus that are both structurally interesting and aesthetically pleasing (e.g., menus with circular or hexagonal structures) and present tools and applications in a highly organized, intuitive, compact, and easily navigable manner. The provided techniques may also allow user-specific "palettes" of software tools and applications to be generated, personalized, and shared with others, thereby enabling users to curate repeatable experiences within a software ecosystem.

The methods disclosed herein may employ machine learning techniques in numerous ways. For example, trained machine learning models may be used to generate representative digital objects (e.g., visual icons) for each software tool and application in a menu. These digital objects may help users to efficiently locate tools or applications of interest without requiring users to access or use said tools or applications. Additional trained machine learning models may be used to generate embeddings for the software tools and applications that are based in part upon the representative digital objects. The embeddings may allow the tools and applications in a menu to be quickly organized according to (for example) their functions or use-cases. Trained machine learning models can also be applied to generate metadata for the software tools and applications, which may, in turn, enable the menu to be rapidly reconfigured to display relevant tools and applications in response to specific queries from a user.

The described techniques provide numerous technical advantages. In various embodiments, the provided methods may improve the functioning of a computer by reducing processing power, battery usage, and memory requirements associated with organizing and displaying menus of selectable software tools and applications. The provided menus may be dynamic and flexible and may display both software applications and application-specific tools, allowing users to access tools at a greater scale than is possible in a single application without expending significant cognitive effort to identify the tools. The organizational advantages facilitated by the provided techniques may enable large scale, nuanced management of tools and applications. In particular, the organizational structure of the menus, enabled by the use of embeddings, may enhance user productivity by automatically grouping related tools and applications, which may reduce user time spent searching for relevant tools and applications to perform specific tasks. The customizable palette menus—which may be generated automatically in response to a wide variety of data informing the context of the user's interactions with a software environment—can allow users to efficiently access necessary tools and applications, increasing the amount of time they can spend focusing on their work products. This may be particularly valuable for content curators and creators who wish to cultivate experiences in certain software environments for their audiences.

A method for organizing a plurality of selectable software applications and tools may comprise receiving the plurality of selectable software applications and tools, acquiring, for each software application or tool of the plurality of selectable software applications and tools, one or more representative digital objects associated with the respective software application or tool, generating a plurality of embeddings by providing, for each software application or tool, the corresponding one or more representative digital objects to a trained machine learning model, generating a visual layout of the plurality of selectable software applications and tools based on the plurality of embeddings, and displaying the plurality selectable software applications and tools in accordance with the visual layout. The plurality of software selectable software applications and tools comprises one or more selectable software applications and tools for editing text files, one or more selectable software applications and tools for editing image files, one or more selectable software applications and tools for editing audio files, one or more selectable software applications and tools for editing video files, one or more trained machine learning models, or combinations thereof. The one or more representative digital objects associated with each software application or tool of the plurality of software applications and tools may comprise metadata associated with each software application or tool, a software program associated with the software application or tool, a visual icon representing the software application or tool, a textual description of the software application or tool, or combinations thereof. Generating the visual layout based on the plurality of embeddings may involve projecting each embedding of the plurality of embeddings into a two-dimensional vector space and arranging the plurality of embeddings based on the projections of the plurality of embeddings.

The method can further comprise displaying a palette menu comprising a subset of the plurality of selectable software applications and tools. The palette menu may be displayed in response to a user request, which may be input using a custom keyboard shortcut, a custom computer mouse gesture, a custom stylus gesture, or a combination thereof. If a user request to modify the palette menu is received, the plurality of selectable software applications and tools may be displayed in response to receiving the user request.

In some embodiments of the method, a user selection of a software application or tool of the plurality of selectable software applications and tools from the displayed plurality of software applications and tools may be received. An updated palette menu comprising an updated subset of the plurality of selectable software applications and tools may then be displayed. The updated subset may include the selected software application or tool. A user request to remove a software application or tool from the subset of the plurality of selectable software applications and tools in the palette menu can also be received, in which case an updated palette menu comprising an updated subset of the plurality of selectable software applications and tools that does not include the removed software application or tool may be displayed.

If an indication of a change in a context of user activity is received, a second subset of the plurality of selectable software applications and tools may be identified based on the change in the context. An updated palette menu comprising the second subset of the plurality of selectable software applications and tools may then be displayed. The indication of the change in the context of the user activity may comprise an indication of a change in a file type being edited by the user. Identifying the second subset of the plurality of selectable software applications and tools may involve identifying software applications and tools associated with the file type using the plurality of embeddings.

A user request to share the palette menu with a second user may be received. One or more datasets for the palette menu may be generated and transmitted to the second user. The one or more datasets may be used to generate and display the palette menu on a remote computer system. Displaying the palette menu to the second user may involve identifying a software application or tool of the subset of selectable software applications and tools that is not accessible to the second user and visually indicating a course of action for gaining access to the inaccessible software application or tool to the second user in the displayed palette menu.

The method may further comprise receiving a search query from a user via a search control. A first software application or tool of the plurality of selectable software applications and tools that aligns with the search query may be identified based on metadata associated with the first software application or tool. One or more additional software applications or tools that align with the search query may then be identified based on the plurality of embeddings. The first software application or tool and the one or more additional software applications or tools may be displayed.

A system for displaying a visual space comprising a plurality of selectable software applications and tools may include one or more processors configured to receive the plurality of selectable software applications and tools, acquire, for each software application or tool of the plurality of selectable software applications and tools, one or more representative digital objects associated with the software application or tool, generate a plurality of embeddings by providing, for each software application or tool, the corresponding one or more representative digital objects to a trained machine learning model, generate a visual layout of the plurality of selectable software applications and tools based on the embeddings, and display the visual space comprising the plurality of selectable software applications and tools in accordance with the visual layout.

A non-transitory computer readable storage medium may store instructions for displaying a visual space comprising a plurality of selectable software applications and tools. The instructions, when executed by one or more processors of a computer system, may cause the computer system to receive the plurality of selectable software applications and tools, acquire, for each software application or tool of the plurality of selectable software applications and tools, one or more representative digital objects associated with the software application or tool, generate a plurality of embeddings by providing, for each software application or tool, the corresponding one or more representative digital objects to a trained machine learning model, generate a visual layout of the plurality of selectable software applications and tools based on the embeddings, and display the visual space comprising the plurality of selectable software applications and tools in accordance with the visual layout.

BRIEF DESCRIPTION OF THE FIGURES

The following figures show various systems, methods, apparatuses, and software application and tool menus. The systems, methods, apparatuses, and software application and tool menus shown in the figures may have any one or more of the characteristics described herein.

This application contains at least one drawing executed in color. Copies of this patent application publication with color drawing(s) will be provided by the Office upon request and payment of the necessary fee.

DETAILED DESCRIPTION

Figure 1:
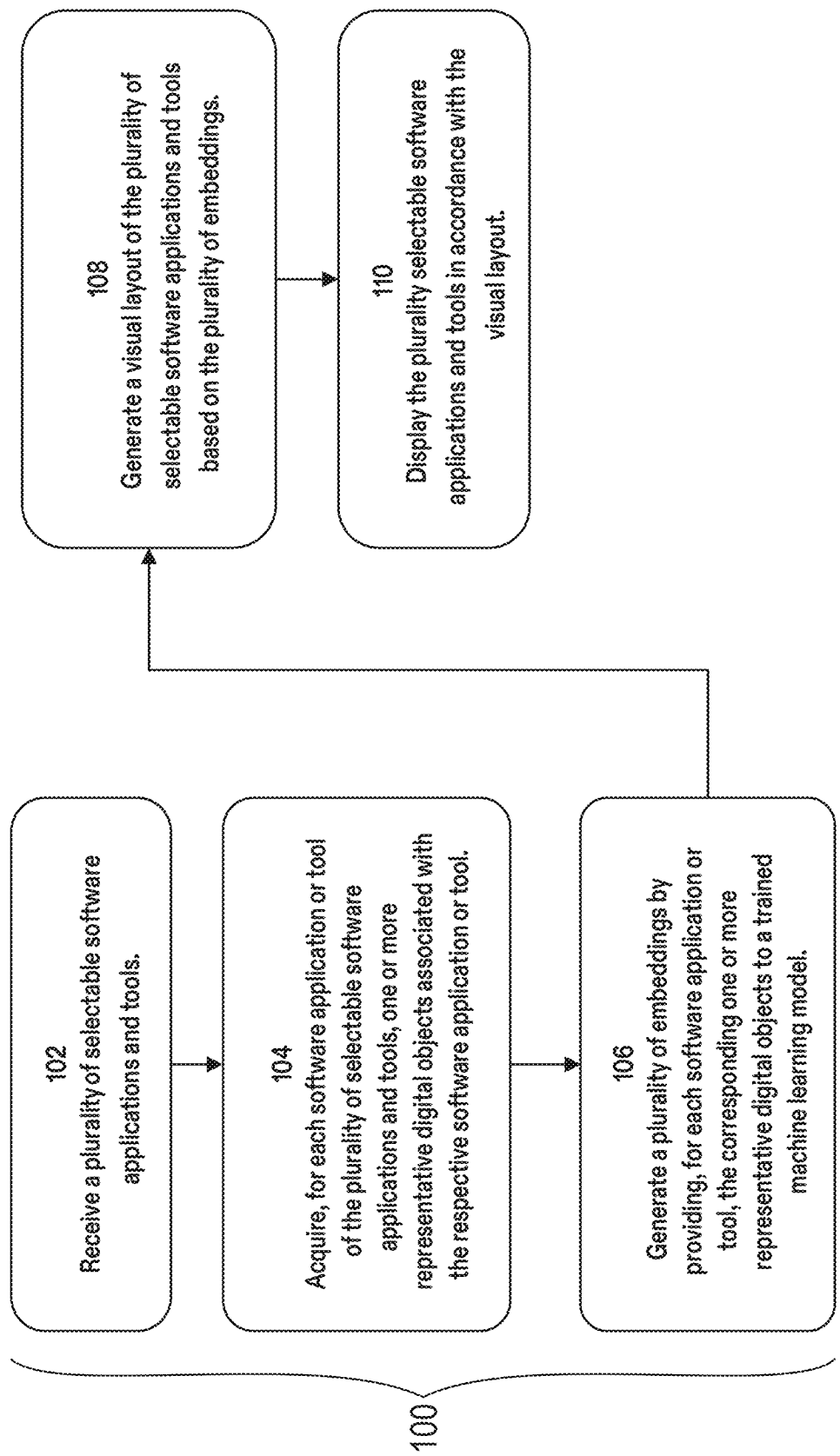
FIG. 1 shows a method for organizing a plurality of selectable software tools and applications, according to some embodiments.

Described are systems, methods, apparatuses, and non-transitory computer readable storage media for organizing a plurality of software applications and tools. The provided systems, methods, apparatuses, and non-transitory computer readable storage media may leverage trained machine learning models impose structure upon the menu. Using embeddings of the software tools and applications, the disclosed methods may produce an interactive menu that presents the tools and applications in a highly organized, intuitive, and easily navigable manner. The provided systems, methods, apparatuses, and non-transitory computer readable storage media may allow user-specific "palettes" of software tools and applications to be generated, personalized, and shared with others, thereby enabling users to curate repeatable experiences within a software ecosystem.

Organizing a received set of selectable software applications and tools according to the described techniques may involve acquiring representative digital objects for each software application and tool. These digital objects can be, for example, visual icons that represent the functions of the software applications and tools. After the digital objects are acquired, may be provided to a trained machine learning model to generate a plurality of embeddings. A visual layout for the set of software applications and tools may be produced based on the generated embeddings. The software applications and tools may then be displayed according to the visual layout.

The systems, methods, apparatuses, and non-transitory computer readable storage media disclosed herein may employ machine learning techniques in numerous ways. For example, trained machine learning models may be used to generate the representative digital objects (e.g., visual icons) for each software tool and application in a menu. These digital objects may help users to efficiently locate tools or applications of interest without requiring users to access or use said tools or applications. Additionally, as noted above, trained machine learning models may be used to generate embeddings for the software tools and applications that are based in part upon the representative digital objects. The embeddings may allow the tools and applications in a menu to be quickly organized according to (for example) their functions or use-cases. Trained machine learning models can also be applied to generate metadata for the software tools and applications, which may, in turn, enable the menu to be rapidly reconfigured to display relevant tools and applications in response to specific queries from a user.

The described systems, methods, apparatuses, and non-transitory computer readable storage media provide numerous technical advantages. In various embodiments, the provided methods may improve the functioning of a computer by reducing processing power, battery usage, and memory requirements associated with organizing and displaying menus of selectable software tools and applications. The organizational structure of the menus, enabled by the use of embeddings, may enhance user productivity by reducing time spent searching for relevant tools and applications to perform specific tasks. In particular, the customizable palette menus—which may be generated (at least in part) automatically in response to a user's interactions with a software environment—can allow users to efficiently access necessary tools and applications, increasing the amount of time they can spend focusing on their work products. This may be particularly valuable for content curators and creators who wish to cultivate experiences in certain software environments for their audiences.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 show an exemplary method 100 for organizing a plurality of selectable software applications and tools. Method 100 may be executed by one or more processors of a computer system (e.g., a user's personal computer). Instructions that configure processors of a computer system to perform method 100 may be stored in the computer system's memory or using a computer readable storage medium. One or more steps of method 100 may be carried out automatically, for example upon receipt of necessary user input.

Method 100 may be performed, for example, using one or more electronic devices implementing a software platform. In some examples, method 100 is performed using a client-server system, and the blocks of method 100 are divided up in any manner between the server and a client device. In other examples, the blocks of method 100 are divided up between the server and multiple client devices. In other examples, method 100 is performed using only a client device or only multiple client devices. In method 100, some blocks are, optionally, combined, the order of some blocks is, optionally, changed, and some blocks are, optionally, omitted. In some examples, additional steps may be performed in combination with the method 100. In some examples, one or more blocks of method 100 are reordered. Accordingly, the operations as illustrated (and described in greater detail below) are exemplary by nature and, as such, should not be viewed as limiting.

In a first step 102, a plurality of selectable software applications and tools may be received. The received software applications and tools can include applications and tools for editing files, for example applications and tools for editing text files (e.g., tools for editing fonts, text editors such as Microsoft Word, etc.), applications and tools for editing video files (e.g., tools for trimming videos, video editing software such as Adobe Premier Pro), applications and tools for editing image files (e.g., tools for cropping images, graphics editors such as Photoshop, etc.), applications and tools for editing audio files (e.g., music creation or editing software), applications and tools for editing multimedia files, or combinations thereof. The software applications and tools can also include machine-learning-based applications and tools, for example large language models (e.g., GPT), generative artificial intelligence programs (e.g., Midjourney, DALL-E, etc.), and the like.

The software applications and tools may be associated with a software environment, for example a software environment for viewing, organizing, and editing files. The software applications and tools can include tools that provide various functionalities within an application. For example, the software applications and tools can include tools with image editing functionalities (e.g., image cropping, color enhancement, etc.) from an image editing application such as Photoshop or tools with text editing functionalities (e.g., font customization, layout editing, etc.) from a text editing application such as Microsoft Word. In some embodiments, a programmer of an existing application or a programmer of the software environment with which the tools and applications are associated may specify or provide tools from existing applications.

Users of the software environment associated with the applications and tools may also create their own, customized tools that can be shared with other users of the software environment. For example, a user of a software environment for viewing and organizing image files may create a tool for generating images with a specific aesthetic by training a generative artificial intelligence model using a selection of image files having that aesthetic. Such a user may be, e.g., an artist, and the selection of image files used to train the generative artificial intelligence model may be a set of paintings by the artist. Once the model is trained, the artist may provide it as a tool for other users of the software environment. The other users may use the tool to generate new image files in the style of the artist's paintings.

After the software applications and tools have been received, one or more representative digital objects may be acquired for each application or tool (step 104). The representative digital object(s) associated with an application or tool may comprise data associated with the application or tool, code that underlies the application or tool, files (e.g., image files, text files, audio files, etc.) that indicate or describe a function, use-case, or key feature of the application or tool, or combinations thereof. For example, if an application or tool comprises a neural network, the representative digital object(s) associated with that application or tool may comprise the code for a layer of the neural network. In some embodiments, the representative digital object(s) for a software application or tool is/are provided by a user or is/are received along with the software application or tool (e.g., the digital object(s) may be provided by a developer of the software application or tool). Representative digital object(s) associated with a software application or tool can also be generated by providing the software application or tool (and, in some embodiments, metadata associated with the software application or tool) to a trained machine learning model.

In some embodiments, the representative digital object(s) associated with each software application or tool include(s) a visual icon for the software application or tool. A visual icon for a software application or tool may graphically indicate a function of the software application or tool. For example, a visual icon for a tool for cropping an image may include an image of a pair of scissors. A visual icon for a software application or tool can be generated using a trained machine learning model such as a generative artificial intelligence model by providing the software application or tool and/or metadata associated with the software application or tool to the model. Visual icons for other software applications or tools may be uploaded by a user or provided by a developer of the software application or tool.

All of the visual icons may be encoded using the same file format. For example, all of the visual icons may be images encoded as PNGs. If an image intended to be used as a visual icon is acquired and is not in the appropriate file format (e.g., if the appropriate file format is PNG and the acquired image is a JPEG), then the acquired image may be converted to the appropriate file format using any suitable process. Similarly, all of the visual icons may have the resolution and may be the same size. Acquired images of the wrong resolution or size that are intended to be used as visual icons may be edited (e.g., cropped, enhanced) as necessary to generate images with the correct properties.

In some embodiments, the representative digital object(s) associated with each software application or tool include(s)

metadata associated the software application or tool. Metadata may be ingested by the computer system (e.g., may be input into the computer system by a user) or, in some cases, extracted from each software application or tool by the computer system. The metadata associated with a given software application or tool may include (but is not limited to) a name or title associated with the application or tool, a description of the function of the application or tool, a description of one or more use cases of the application or tool, a description or list of key features of the application or tool, documentation associated with the application or tool, information about the data structures or interfaces associated with the application or tool, version control information, information about a developer of the software application or tool, or combinations thereof. In some embodiments, metadata for a received software application or tool is generated by providing data associated with the application or tool—for example, a software program associated with the application or tool—to a trained machine learning model.

In some embodiments, the representative digital object(s) associated with each software application or tool include(s) data about users of the software application or tool. User data associated with a software application or tool may be extracted from or generated based on user profiles for users of a software environment. User data may indicate a user's favorite applications and tools, the applications and tools that were recently accessed by the user, recent user activity associated with the software environment.

After the representative digital objects are acquired for each software tool and application, the representative digital objects may be used to generate a plurality of embeddings (step 106). The embeddings may be vectors that represent the software tools and applications and may be generated using any algorithm that can receive the representative digital objects as an input and produce vectors of numeric values (e.g., floating values) as an output. In some embodiments, the embeddings are precalculated (e.g., calculated prior to the execution of further steps in method 100 and stored to be accessed as needed). In other embodiments, the embeddings are calculated in real time as they are needed (e.g., as they are needed in subsequent steps of method 100).

Each software tool and application may be associated with one or more embeddings. In some embodiments, one or more embeddings are generated for each representative digital object associated with a software tool or application. For example, if the representative digital objects for a software tool or application include code for the software tool or application, metadata for the software tool or application, user data for users of the software tool or application, and a visual icon that represents the software tool or application, then the software tool or application may have associated embeddings representing the code, the metadata, the user data, and the visual icon. The embeddings may be stored in one or more embedding libraries.

Figure 2:
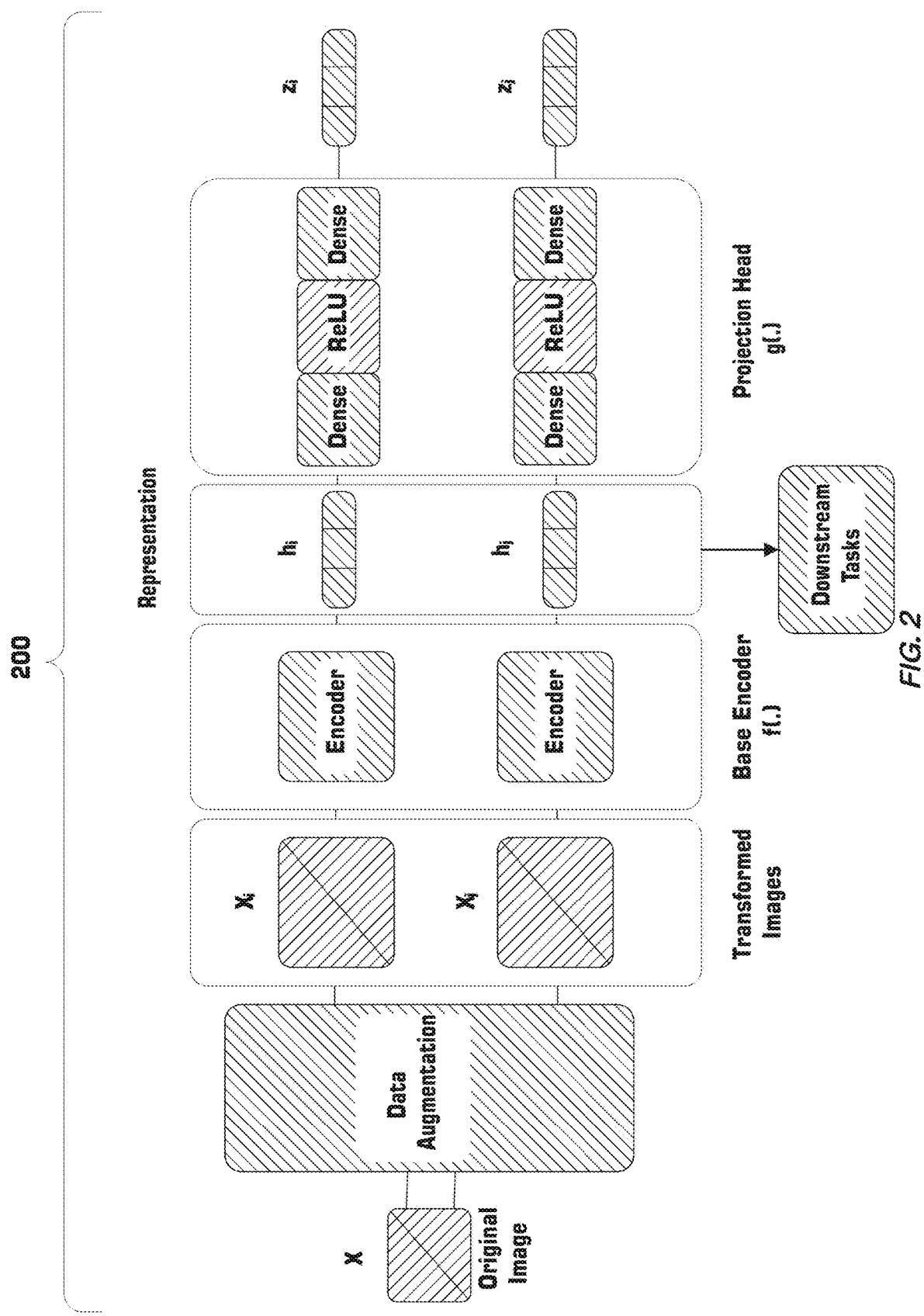
FIG. 2 shows a method for training a machine learning algorithm to generate embeddings, according to some embodiments.

A trained machine learning model can be used to generate the plurality of embeddings. FIG. 2 illustrates a training process 200 for a contrastive learning algorithm that can be used to generate embeddings in step 106 of method 100. During training, an original image X is obtained. Data transformation or augmentation can be applied to the original image X to obtain two augmented images $X_i$ and $X_j$. For example, two separate data augmentation operators (e.g., crop, flip, color jitter, grayscale, blur, etc.) can be randomly applied to the original image X to obtain $X_i$ and $X_j$. Each of the two augmented images $X_i$ and $X_j$ may then be passed through an encoder to obtain respective vector representations in a latent space. The two encoders may have shared weights. In some examples, each encoder is implemented as a neural network. For instance, an encoder can be implemented using a variant of the residual neural network ("ResNet") architecture.

The encoders may output a vector $h_i$ from augmented image $X_i$ and a vector $h_j$ from the augmented image $X_j$. The two vector representations $h_i$ and $h_j$ may be passed through a projection head to obtain two projections, $z_i$ and $z_j$. In some examples, the projection head comprises a series of non-linear layers (e.g., a dense layer, followed by a ReLU layer, followed by a dense layer) that apply non-linear transformations to the vector representation to obtain the projection. The projection head may amplify invariant features and maximize the ability of the network to identify different transformations of the same image.

The software applications and tools, representative digital objects, and embeddings may be stored in a set of data stores. For example, the plurality of software applications and tools may be stored in a software applications and tools store, the representative digital objects may be stored in a digital objects data store (or in multiple digital object data stores, if each software application or tool has multiple associated representative digital objects), and the plurality of embeddings may be stored in an embedding store. Each software application or tool in the software applications and tools store may be associated with one or more of the digital objects in the one or more digital object data stores. For example, each software application or tool in the software applications and tools store may be associated with a visual icon in a visual icon data store and associated with metadata in a metadata store. Each software application or tool in the software applications and tools store may also be associated with one or more embeddings in the embedding store. This may allow, e.g., a representative digital object in a digital object store to be mapped to an application or tool in the software applications and tools store which, in turn, may be mapped to one or more embeddings in the embedding store. Likewise, each embedding in the embedding store may be associated with a digital object in a digital object store that was used to generate the embedding. Said digital object may, in turn, be associated with an application or tool in the software applications and tools store. Accordingly, an embedding in the embedding store may be mapped to a digital object in the digital object store which itself may be mapped to an application or tool in the software applications and tools store.

Returning to FIG. 1, a visual layout of the plurality of software applications and tools may be generated based on the plurality of embeddings (step 108). Generating the visual layout of the plurality of software applications and tools may involve determining a geometric outline or shape and/or organizing the plurality of software applications and tools with respect to one another (possibly within the geometric outline or shape).

A geometric outline or shape can be automatically determined by the computer system, for example using a trained machine learning model. Alternatively, the computer system may automatically select a geometric outline or shape from a library of geometric outlines or shapes. A user can also input a geometric outline or shape, for instance by uploading an image of a geometric outline or shape (e.g., an image of a circle) or by inputting a text description of a geometric outline or shape (e.g., by inputting the string "circle" into an appropriate user input field).

To organize the plurality of software applications and tools with respect to one another, the plurality of embeddings may be associated with one another (e.g., clustered, classified into groups, etc.) based on the relative positions of each embedding in the vector space or latent space that contains the embeddings. The separation distance between two embeddings in the vector space or latent space (where said distance is given, e.g., by a metric induced by a norm of the vector space) may correspond to a degree of similarity between the software applications or tools represented by the embeddings. That is, a pair of software applications or tools represented by two embeddings that are separated by a distance $d_1$ in the vector space may be more similar to one another than another pair of software applications or tools represented by two embeddings that are separated by a distance $d_2 > d_1$. The embeddings may be arranged such that each embedding is grouped or associated with other embeddings with which it is closely related. If the vector space that contains the embeddings is large (e.g., if the dimension of the vector space is greater than or equal to three), then the embeddings can be projected into a two-dimensional vector space (using, e.g., a U-map model) and subsequently arranged based on the relative positions of the two-dimensional projections.

Once the visual layout is generated based on the embeddings, the plurality of software applications and tools may be displayed in accordance to the visual layout (step 110). The display may comprise a graphical user interface (GUI) that includes a menu of the software applications and tools and may be displayed on a computer monitor or other display screen. If a geometric outline or shape was determined or provided in step 108, the menu may have that geometric outline or shape. Comprising the menu may be the representative digital objects (e.g., the visual icons) associated with the plurality of software applications and tools. In some embodiments, the representative digital objects are arranged within the display based on the arrangement of the plurality of embeddings determined in step 108. In other embodiments, the representative digital objects are arranged based on, e.g., the use cases of, or other metadata associated with, the applications and tools represented by the digital objects. Each representative digital object may be selectable by a user. When the user selects a representative digital object, the corresponding software application or tool may be launched for use by the user.

If a geometric outline or shape is determined or provided in step 108, displaying the plurality of software applications and tools in step 110 may require packing the representative digital objects (e.g., the visual icons) associated with the software applications and tools within the boundaries of the geometric outline or shape. The representative digital objects may be packed within the boundaries of the geometric outline or shape using a shape packing optimization algorithm that divides the geometric outline or shape into a plurality of containers or bins (e.g., two-dimensional convex regions) and then packs the representative digital objects into the plurality of containers or bins according to one or more predetermined packing rules (e.g., rules indicating a maximum packing density, that there should be no overlap between the digital objects, etc.). The shape packing algorithm may be augmented using the plurality of embeddings to ensure that similar or related software applications and tools are closely grouped within the geometric outline or shape.

Figure 3:
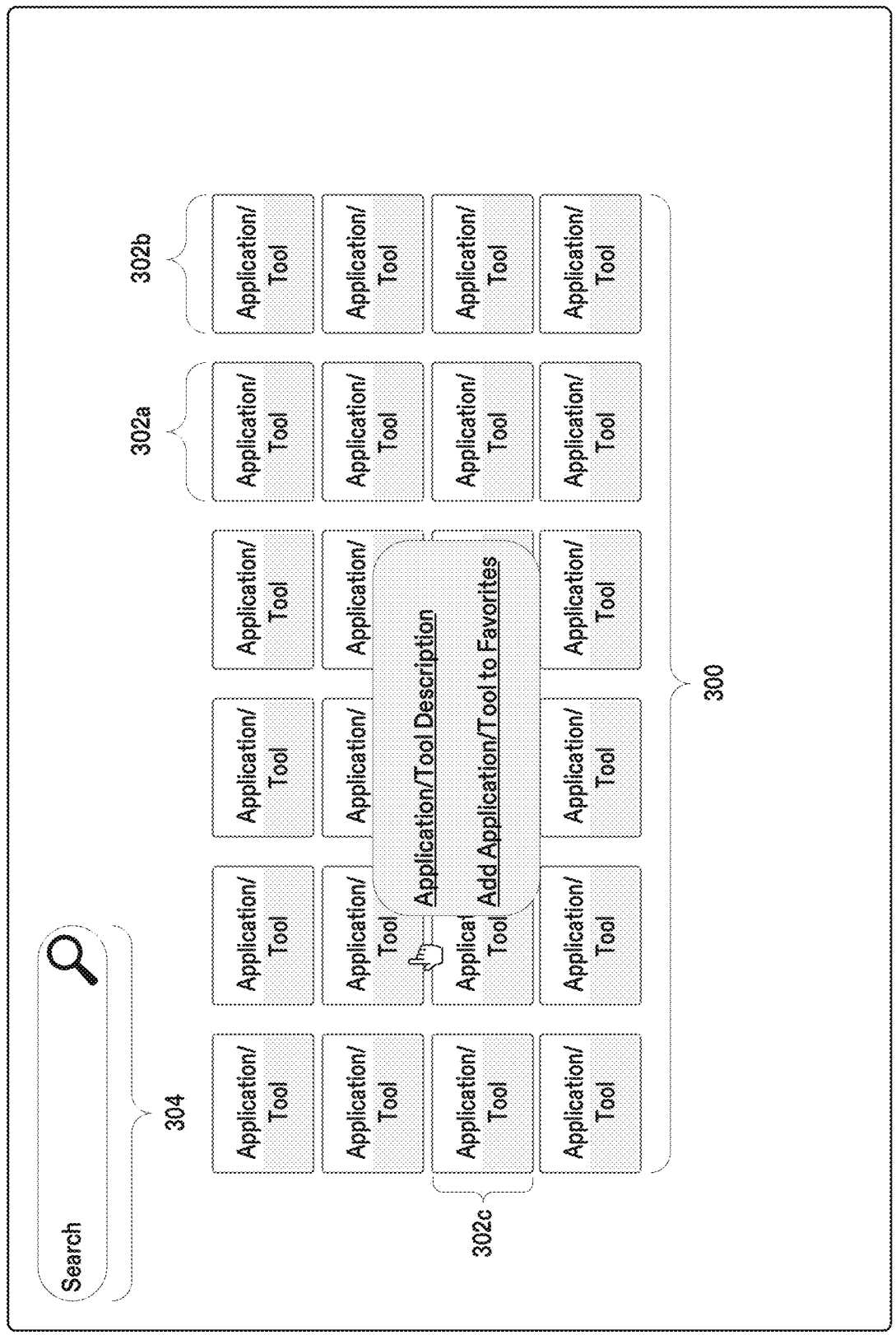
FIG. 3 shows a display of a plurality of selectable software tools and applications, according to some embodiments.

An exemplary display of a plurality of selectable software applications and tools is illustrated in FIG. 3. As shown, the plurality of selectable software applications and tools 300 may be represented by selectable digital objects (e.g., visual icons) and arranged in a menu having a specific geometric outline or shape (in this case, a rectangular shape).

Digital objects displayed closer to one another may represent software applications or tools with similar associated embedding values. Software applications or tools with similar associated embedding values may have similar code, similar functions, similar use cases, or other notable similarities. Thus, the distance between the displayed digital objects may provide a visual indication of the relationships between the software applications and tools. For example, the distance between the displayed digital object for an application or tool 302a and the displayed digital object for a closely related application or tool 302b may be smaller than the distance between the displayed digital object for application or tool 302a and the displayed digital object for an unrelated application or tool 302c.

When a user interacts with a digital object in the menu, for example by hovering over the digital object with their cursor, information (or links to information) about the software application or tool may be displayed (e.g., in a pop-up window). If an application or tool has associated sub-applications, sub-tools, or settings that can be accessed or customized by the user, interacting with the digital object in the menu may display and/or allow the user to select the sub-applications, sub-tools, or settings. Interacting with a digital object may also allow the user to perform certain actions such as, e.g., bookmarking or favoriting the corresponding software application or tool for easy access. When the user selects a representative digital object (e.g., by clicking the digital object with their cursor or by entering an appropriate pattern of keystrokes using their keyboard), the corresponding software application or tool may be launched for use by the user.

The display of the plurality of selectable software applications and tools may include one or more user controls. In particular, the display may include a search control 304. A user may search for a software application or tool of interest by providing a search query via search control 304. In response to the search query, the display of the plurality of software applications and tools may be updated to indicate the software applications and tools that most closely align with the search query.

The displayed software applications and tools may be associated with a particular software environment. A user may access the display of the software applications and tools while working within the software environment, for example while creating or editing files within the software environment. In many situations, while working on a given project, a user may only require access to a subset of the plurality of software applications and files. Such a subset may be displayed to the user in a palette menu, that is, in a sub-menu comprising the subset of the plurality of software tools and applications.

Figure 4:
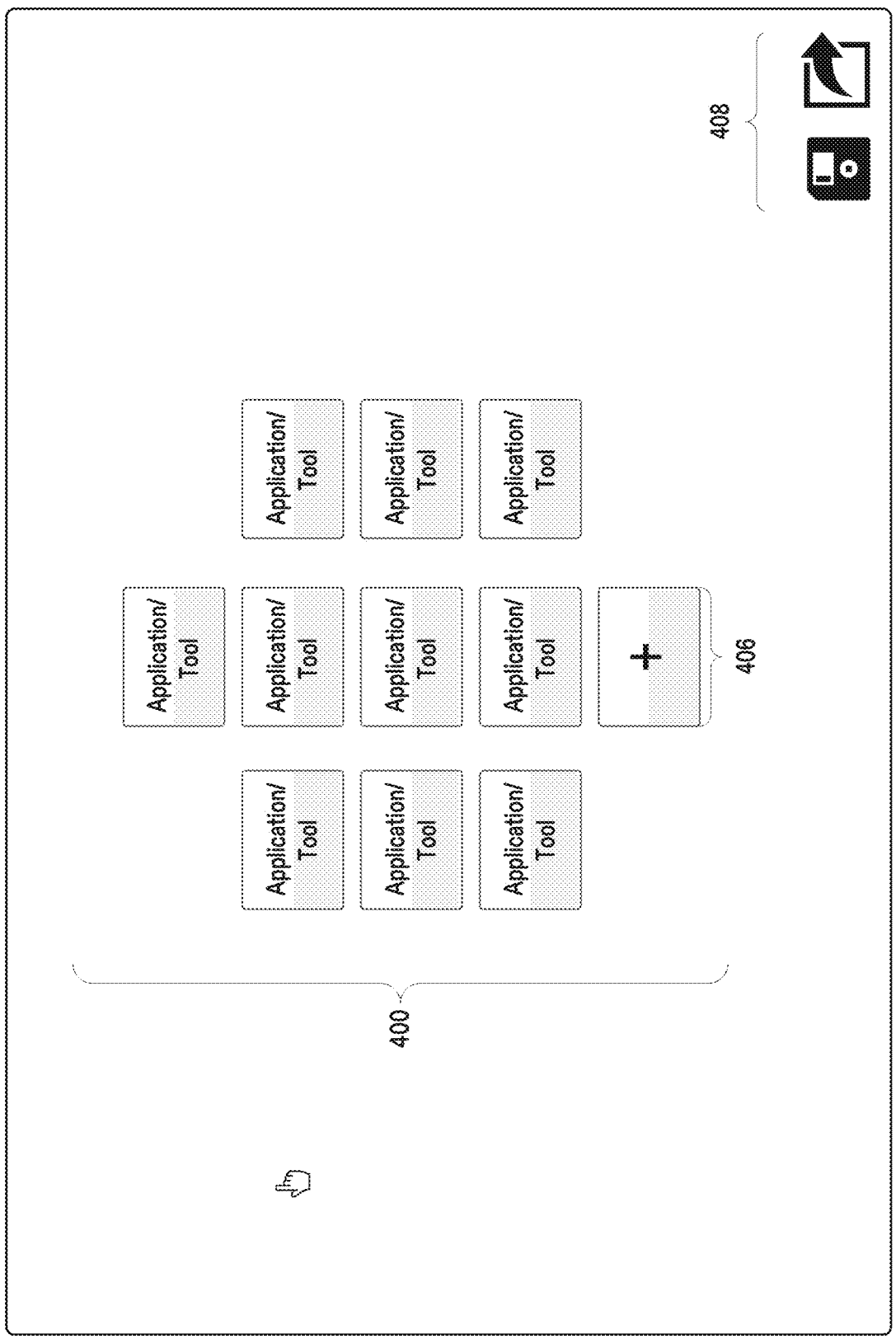
FIG. 4 shows a palette menu comprising a subset of a plurality of selectable software tools and applications, according to some embodiments.

FIG. 4 provides an example palette menu 400. Palette menu 400 may comprise a subset of the plurality of software applications and tools 300 shown in FIG. 3. Palette menus such as palette menu 400 may be generated for various tasks or projects in which a user is engaged. The user may produce a palette menu by, e.g., manually selecting a subset of the plurality of software applications and tools to be included in the palette menu. A palette menu may also be generated automatically, for example based on data indicating a user's most recent interactions with a software environment associated with the display of the plurality of software applications and tools. A palette menu such as palette menu 400 may be displayed in response to a user request. The user request may be input using a custom keyboard shortcut, a custom computer mouse gesture, a custom stylus gesture, or a combination thereof. One or more user controls may be associated with a palette menu such as palette menu 400. For example, a user control 406 may allow the user to modify palette menu 400 by adding new software applications or tools to the subset of software applications or tools included in palette menu 400. User controls 408 may enable the saving of palette menu 400 for repeated use or the sharing of palette menu 400 to other users.

In some embodiments, a palette menu such as palette menu 400 is produced based on the user's demographics in a software environment or a user segment to which the user belongs. The user's demographics or segment may be identified based on, e.g., data that the user has input into the software environment, data that the user has received from the software environment, applications and tools that the user has previously used, a version of the software environment that the user is using, a geographical region from which the user is accessing the software environment, or other metadata associated with the user. When displaying a palette menu, other users of the software environment with demographics similar to the user's or by other members of the user segment may be determined. The tools and applications that are accessed most frequently by similar users may be used to generate the palette menu.

Figure 5:
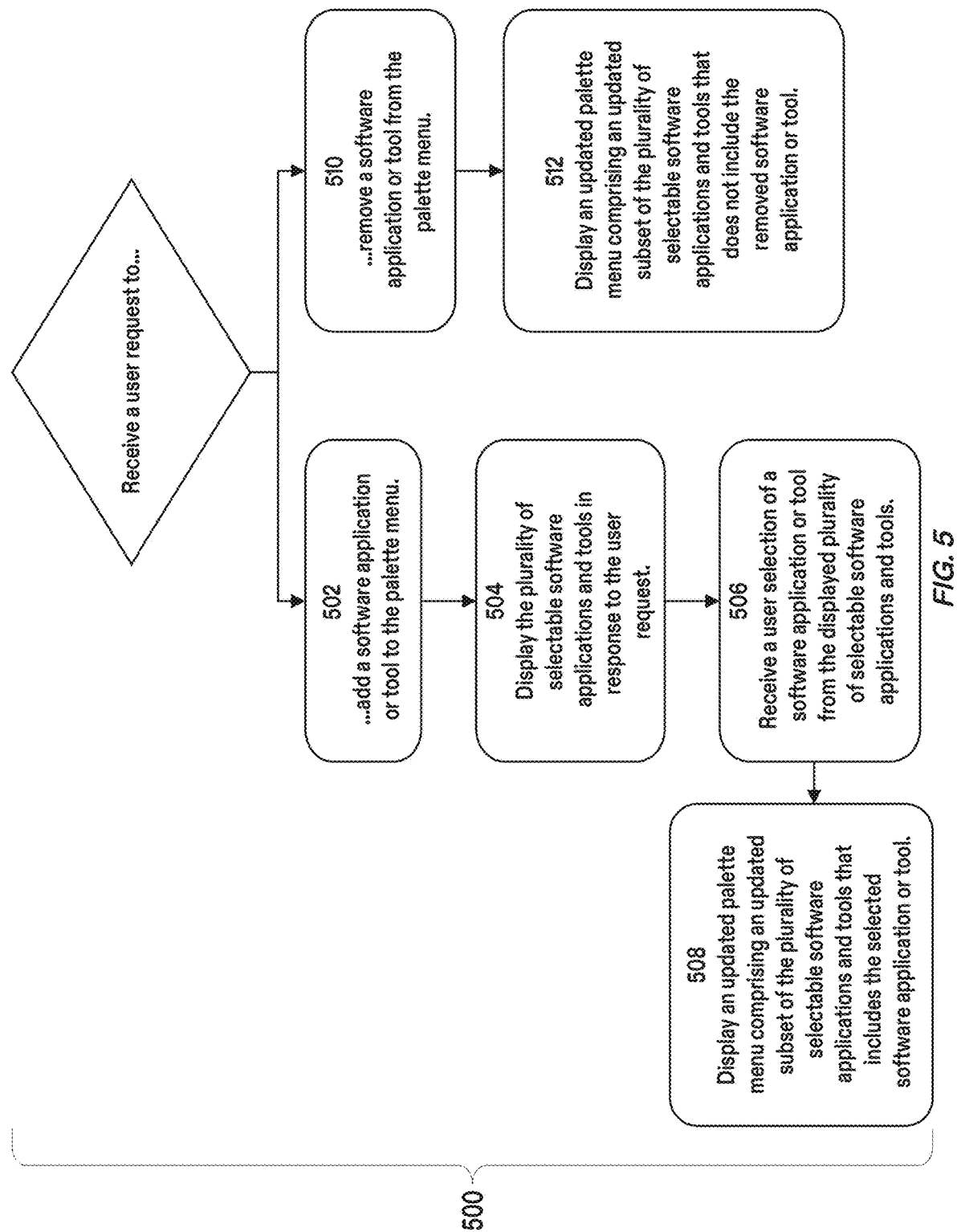
FIG. 5 shows a method for modifying a palette menu comprising a subset of a plurality of selectable software tools and applications, according to some embodiments.

A method 500 for modifying a palette menu is provided in FIG. 5. Modifying the palette menu may involve adding a new software application or tool to the subset of software applications or tools that constitute the palette menu or removing a software application or tool from the subset of software applications or tools that constitute the palette menu.

Method 500 may be performed, for example, using one or more electronic devices implementing a software platform. In some examples, method 500 is performed using a client-server system, and the blocks of method 500 are divided up in any manner between the server and a client device. In other examples, the blocks of method 500 are divided up between the server and multiple client devices. In other examples, method 500 is performed using only a client device or only multiple client devices. In method 500, some blocks are, optionally, combined, the order of some blocks is, optionally, changed, and some blocks are, optionally, omitted. In some examples, additional steps may be performed in combination with the method 500. In some examples, one or more blocks of method 500 are reordered. Accordingly, the operations as illustrated (and described in greater detail below) are exemplary by nature and, as such, should not be viewed as limiting.

Modification may be initiated upon receipt of a user request. If the user request is to add a software application or tool to the palette menu (step 502), then the plurality of software applications and tools of which the applications and tools in the palette menu are a subset may be displayed (step 504), e.g., using method 100 for organizing the plurality of software applications and tools. After the plurality of software applications and tools are displayed, a user selection of a software application or tool of the plurality of software applications and tools may be received (step 506). An updated palette menu comprising an updated subset of the plurality of software applications and tools that includes the selected software application or tool may then be displayed (step 508).

Figure 6A:
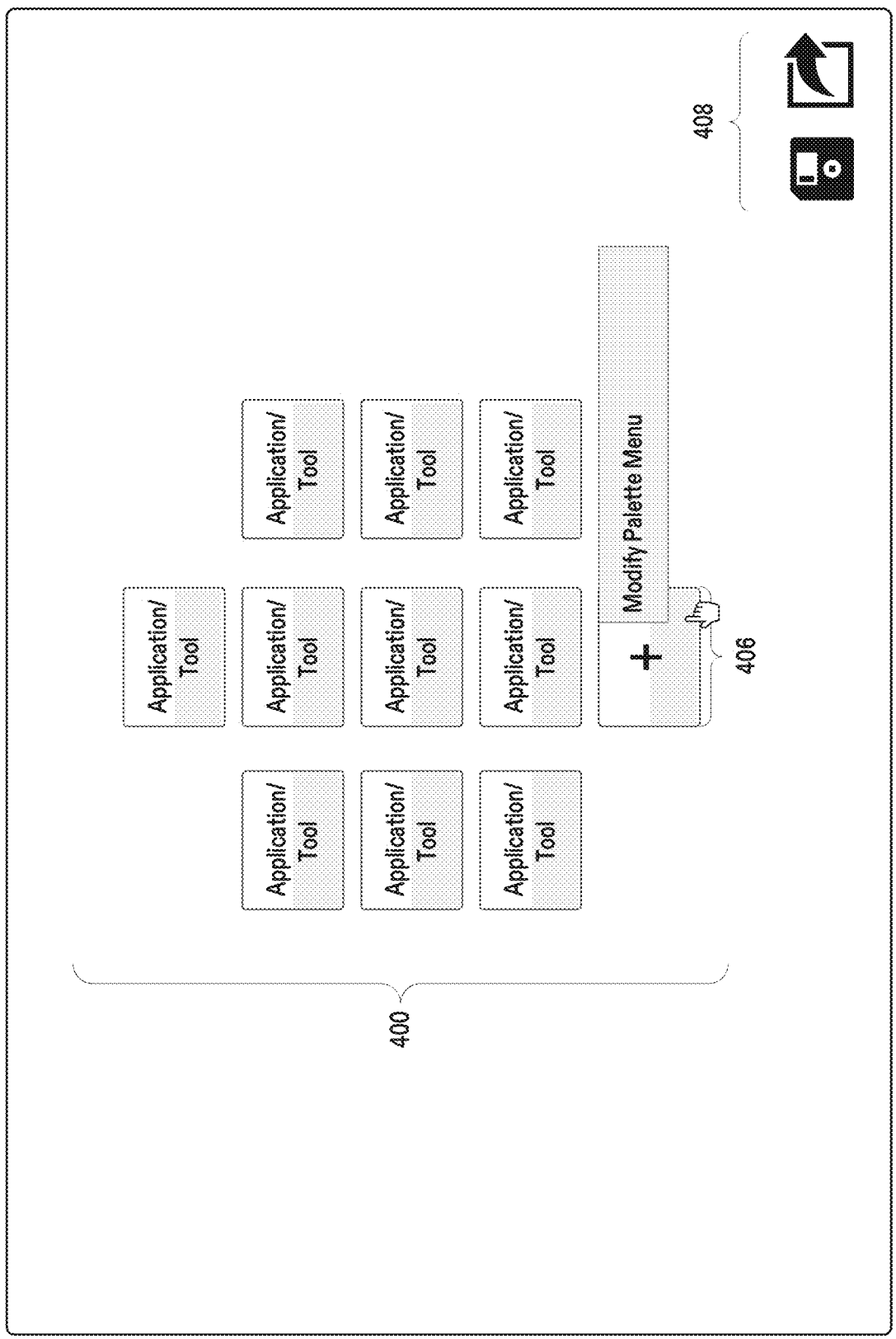
FIG. 6A shows a user control that allows a user to modify a palette menu comprising a subset of a plurality of selectable software tools and applications, according to some embodiments.
Figure 6B:
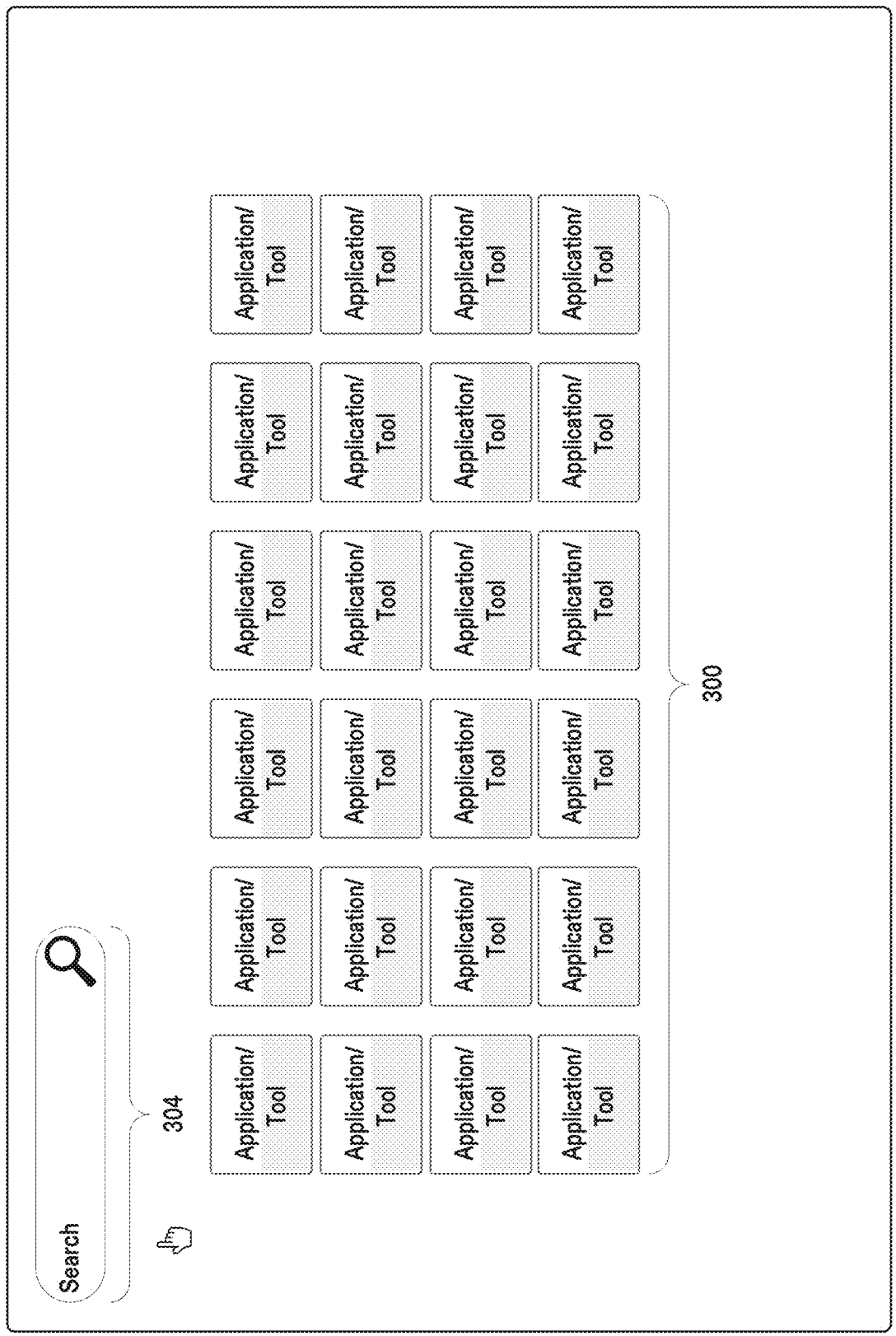
FIG. 6B shows a plurality of selectable software tools and applications displayed in response to a user request to modify a palette menu, according to some embodiments.

FIGS. 6A-6B illustrate steps 502-504, respectively, of method 500 as applied to palette menu 400. As shown, a user may request to add a software application or tool to palette menu 400 by selecting a user control 406 for modifying palette menu 400 (FIG. 6A). In response to the user selection of user control 406, the plurality of software applications and tools 300 may be displayed (FIG. 6B). The display of the plurality of software applications and tools may include user controls such as search control 304.

Figure 7:
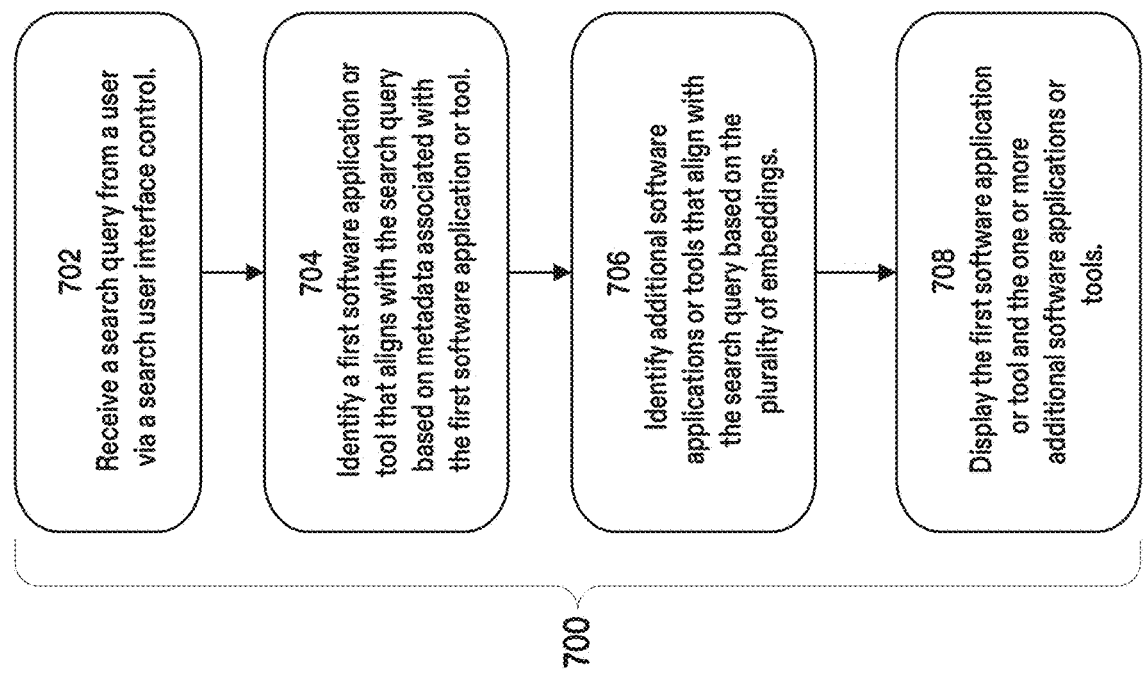
FIG. 7 shows a method for searching a plurality of selectable software tools and applications, according to some embodiments.

Prior to selecting a software application or tool to add to the palette menu in step 506 of method 500, the user may search for a software application or tool of interest in the plurality of software applications and tools. FIG. 7 provides a method 700 for searching the plurality of software applications and tools. Method 700 may be performed, for example, using one or more electronic devices implementing a software platform. In some examples, method 700 is performed using a client-server system, and the blocks of method 700 are divided up in any manner between the server and a client device. In other examples, the blocks of method 700 are divided up between the server and multiple client devices. In other examples, method 700 is performed using only a client device or only multiple client devices. In method 700, some blocks are, optionally, combined, the order of some blocks is, optionally, changed, and some blocks are, optionally, omitted. In some examples, additional steps may be performed in combination with the method 700. In some examples, one or more blocks of method 700 are reordered. Accordingly, the operations as illustrated (and described in greater detail below) are exemplary by nature and, as such, should not be viewed as limiting.

In a step 702, a search query may be received from the user, for example via a search control such as search control 304. Stored digital objects (e.g., stored metadata) associated with the plurality of software applications and tools may be searched to identify a first software application or tool that aligns with the search query (step 704). After the first software application or tool has been identified, additional software applications or tools that align with the search query may be identified based on the plurality of embeddings (step 706). For example, the additional software applications or tools that align with the search query may be identified by locating one or more embeddings of the plurality of embeddings that are, e.g., within a threshold separation distance in the vector space (or in a lower-dimensional projection space) of an embedding associated with the first software application or tool and identifying the software applications or tools that correspond to said one or more embeddings. The first software application or tool and the additional software applications or tools may then be displayed (step 708). The user may select a software application or tool to add to the palette menu from the software applications and tools that are surfaced in response to the search query.

Figure 8A:
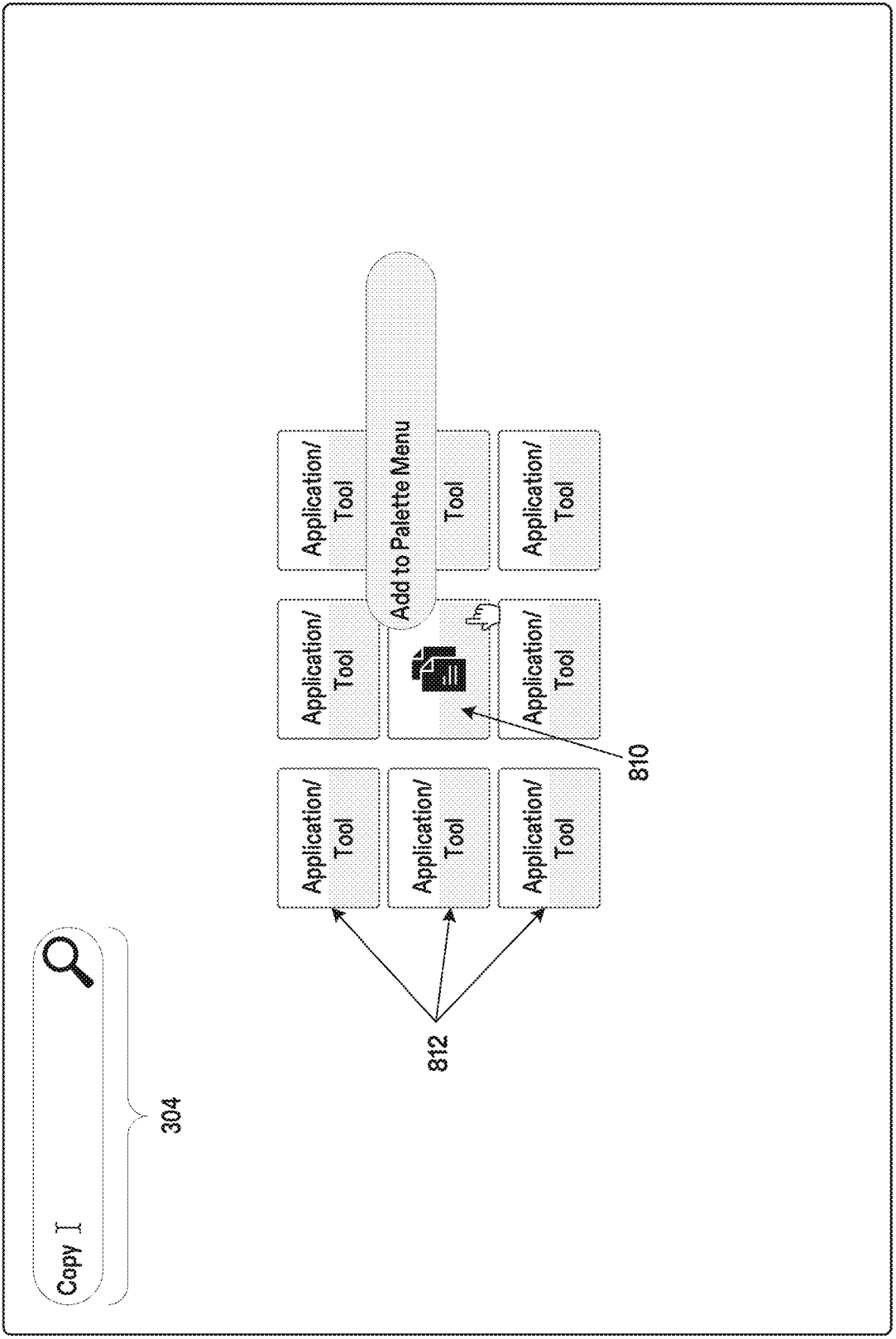
FIG. 8A shows a subset of a plurality of selectable software tools and applications displayed in response to a search query, according to some embodiments.
Figure 8B:
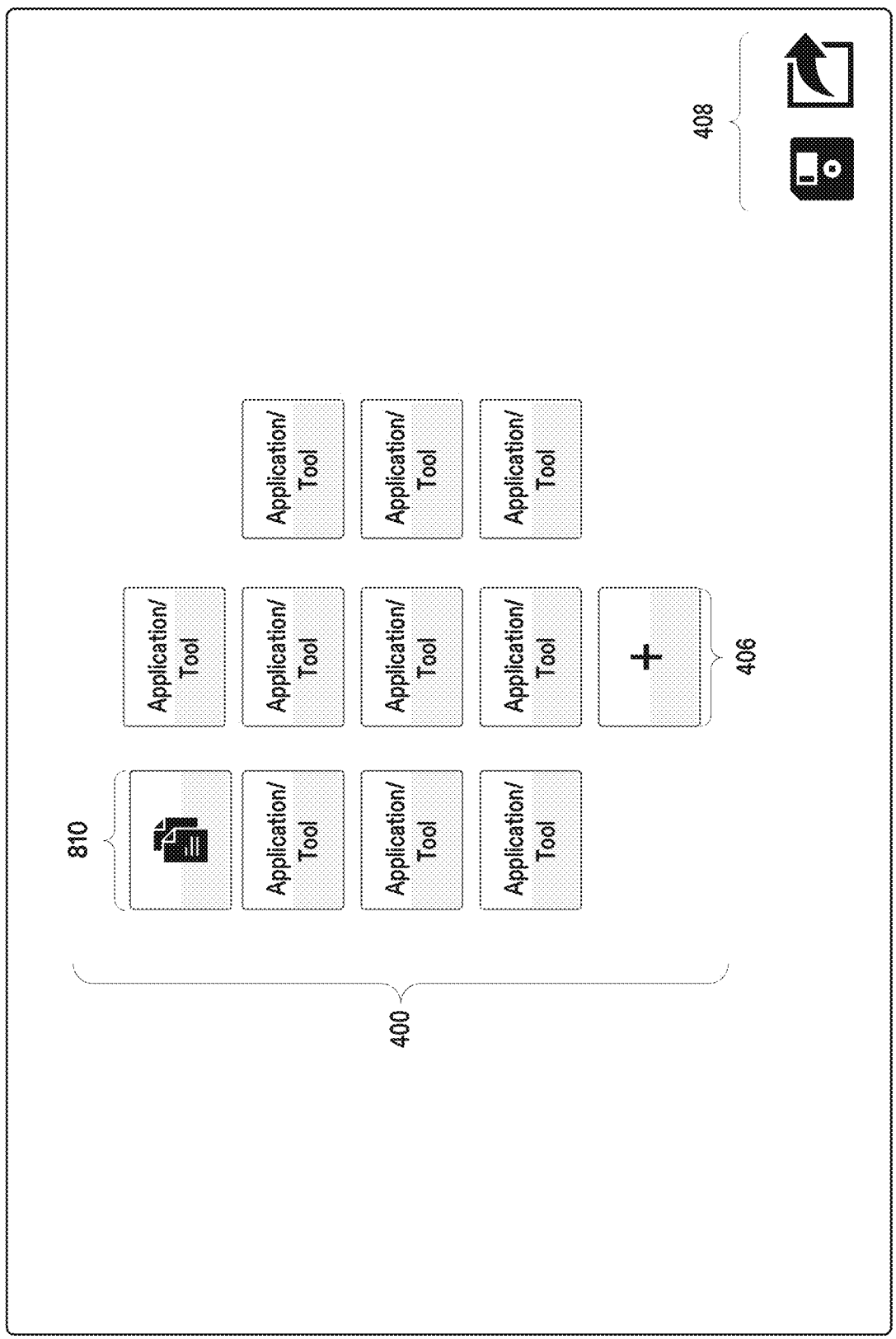
FIG. 8B shows an updated palette menu that includes a user-selected software tool or application, according to some embodiments.

FIGS. 8A-8B illustrate steps 506-508 of method 500 as applied to palette menu 400. After the plurality of software applications and tools 300 is displayed in step 504 (see FIG. 6B), the user may search for a software application or tool of interest by entering a search query into search control 304. As described in method 700 shown in FIG. 7, a first software application or tool 810 that aligns with the search query may be identified by searching stored metadata associated with the plurality of software applications and tools 300. Additional software applications and tools 812 that align with the search query may be identified based on the plurality of embeddings associated with the plurality of software applications and tools 300. The first software application or tool 810 and the one or more additional software applications and tools 812 may be displayed (FIG. 8A). The user may select a software application or tool (e.g., the first application or tool 810, which may be a software application or tool that most closely aligns with the search query) to add the software application or tool to palette menu 400 (FIG. 8B).

Figure 9A:
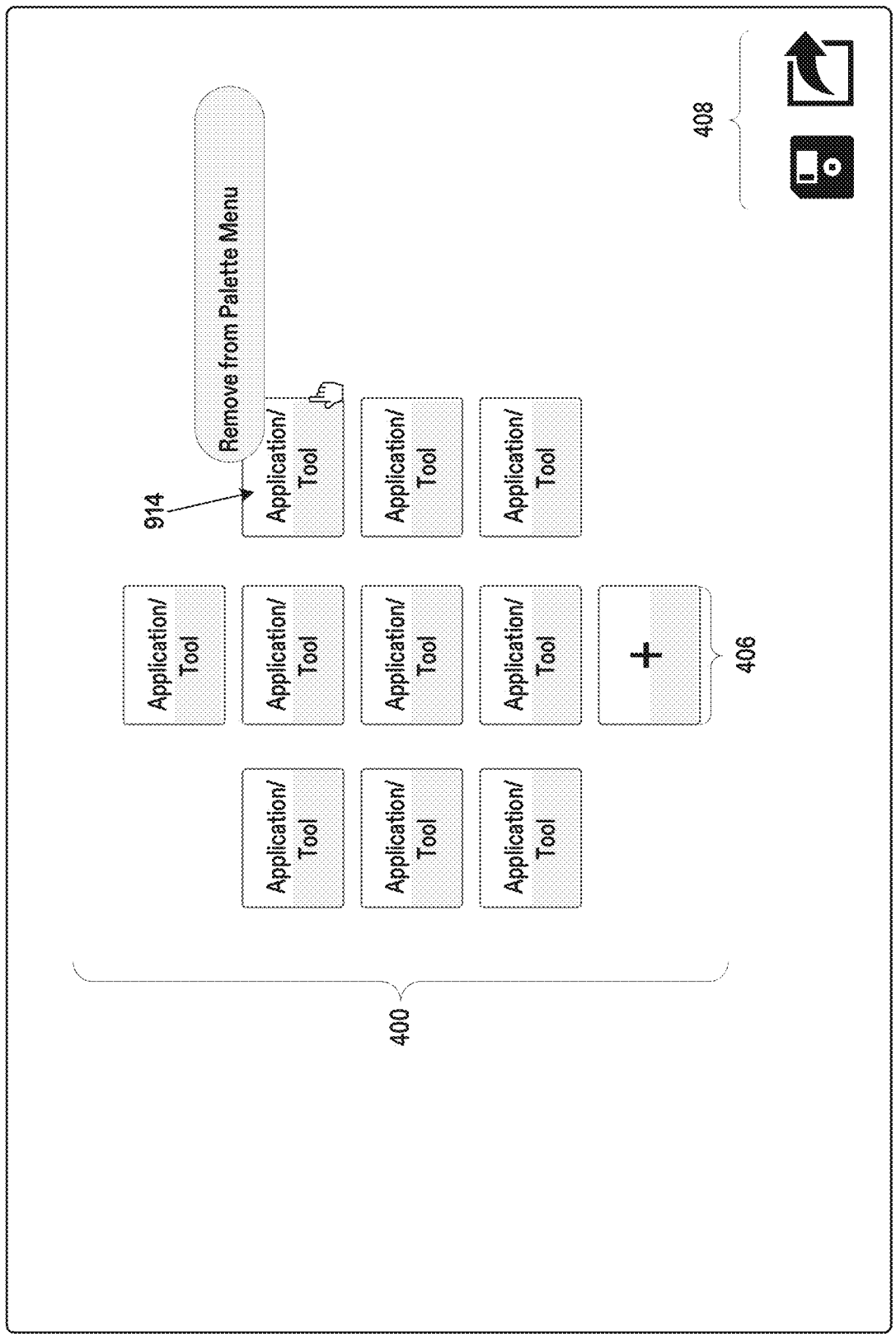
FIG. 9A shows a user control that allows a user to remove a software tool or application from a palette menu comprising a subset of a plurality of selectable software tools and applications, according to some embodiments.
Figure 9B:
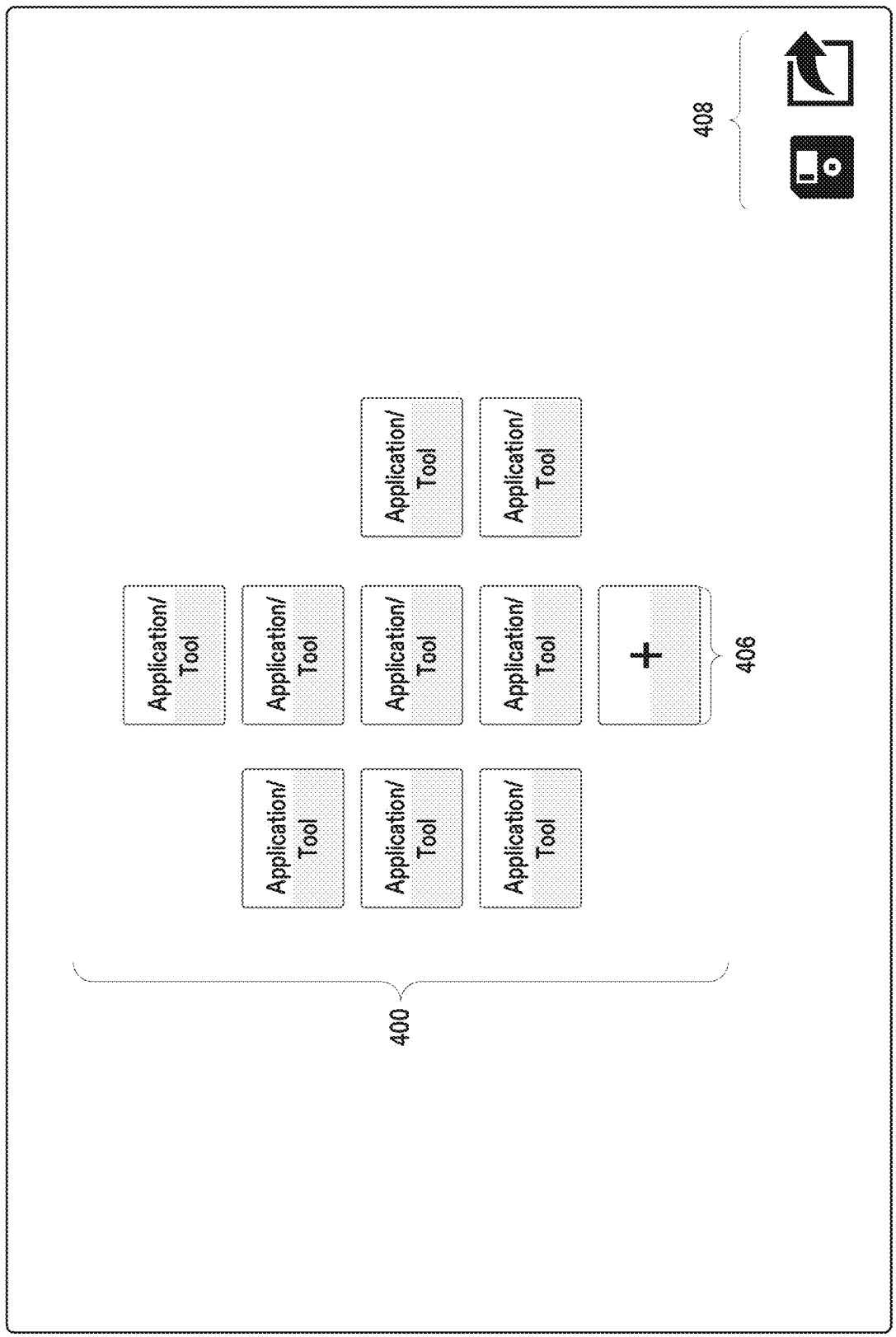
FIG. 9B shows an updated palette menu that does not include a software tool or application that the user has removed, according to some embodiments.

Returning to FIG. 5, if the user request to modify the palette menu is a request to remove a software application or tool from the palette menu (step 510), then an updated palette menu comprising an updated subset of the plurality of software applications and tools that does not include the removed software application or tool may be displayed (step 512). FIGS. 9A-9B illustrate steps 510-512 of method 500 as applied to palette menu 400. A user may select a software application or tool 914 to be removed from palette menu 400 (FIG. 9A). In response to the user's selection, palette menu 400 may be updated such that software application or tool 914 is no longer displayed (FIG. 9B).

Figure 10:
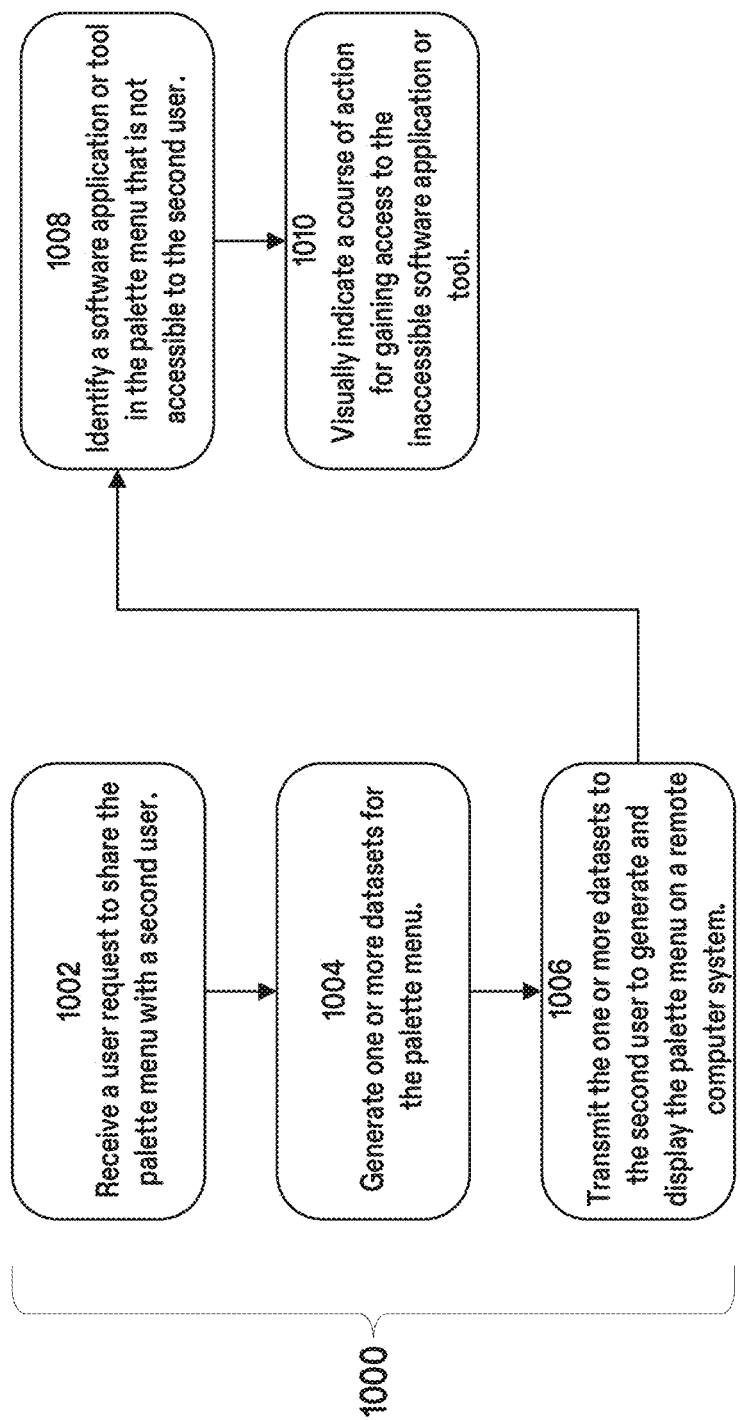
FIG. 10 shows a method for sharing a palette menu comprising a subset of a plurality of selectable software tools and applications, according to some embodiments.

FIG. 10 provides a method 1000 for sharing a palette menu with a second user. Sharing a palette menu may allow a user to share specific software applications and tools to facilitate specific interactions with a given software environment. If, for example, a first user has interacted with a software environment using a set of software applications and tools and wants a second user to experience the same interactions with the software environment, the first user may create and share a palette menu that includes the relevant software applications and tools with the second user.

Method 1000 may be performed, for example, using one or more electronic devices implementing a software platform. In some examples, method 1000 is performed using a client-server system, and the blocks of method 1000 are divided up in any manner between the server and a client device. In other examples, the blocks of method 1000 are divided up between the server and multiple client devices. In other examples, method 1000 is performed using only a client device or only multiple client devices. In method 1000, some blocks are, optionally, combined, the order of some blocks is, optionally, changed, and some blocks are, optionally, omitted. In some examples, additional steps may be performed in combination with the method 1000. In some examples, one or more blocks of method 1000 are reordered. Accordingly, the operations as illustrated (and described in greater detail below) are exemplary by nature and, as such, should not be viewed as limiting.

In a first step 1002, a user request to share a palette menu with a second user may be received. The second user may be associated with a remote computer system (that is, a computer system distinct from the computer system used to, e.g., execute method 100). Upon receipt of the user request to share the palette menu, one or more datasets or data structures for the palette menu may be generated (step 1004). The datasets for the palette menu may store data indicating the subset of software applications and tools that are included in the palette menu, data indicating the organizational structure of the palette menu, data associated with embeddings corresponding to the subset of software applications and tools that are included in the palette menu, metadata associated with the subset of software applications and tools that are included in the palette menu, or combinations thereof. The one or more datasets may be transmitted (e.g., wirelessly) to the second user to generate and display the palette menu on the remote computer system (step 1006).

Figure 11:
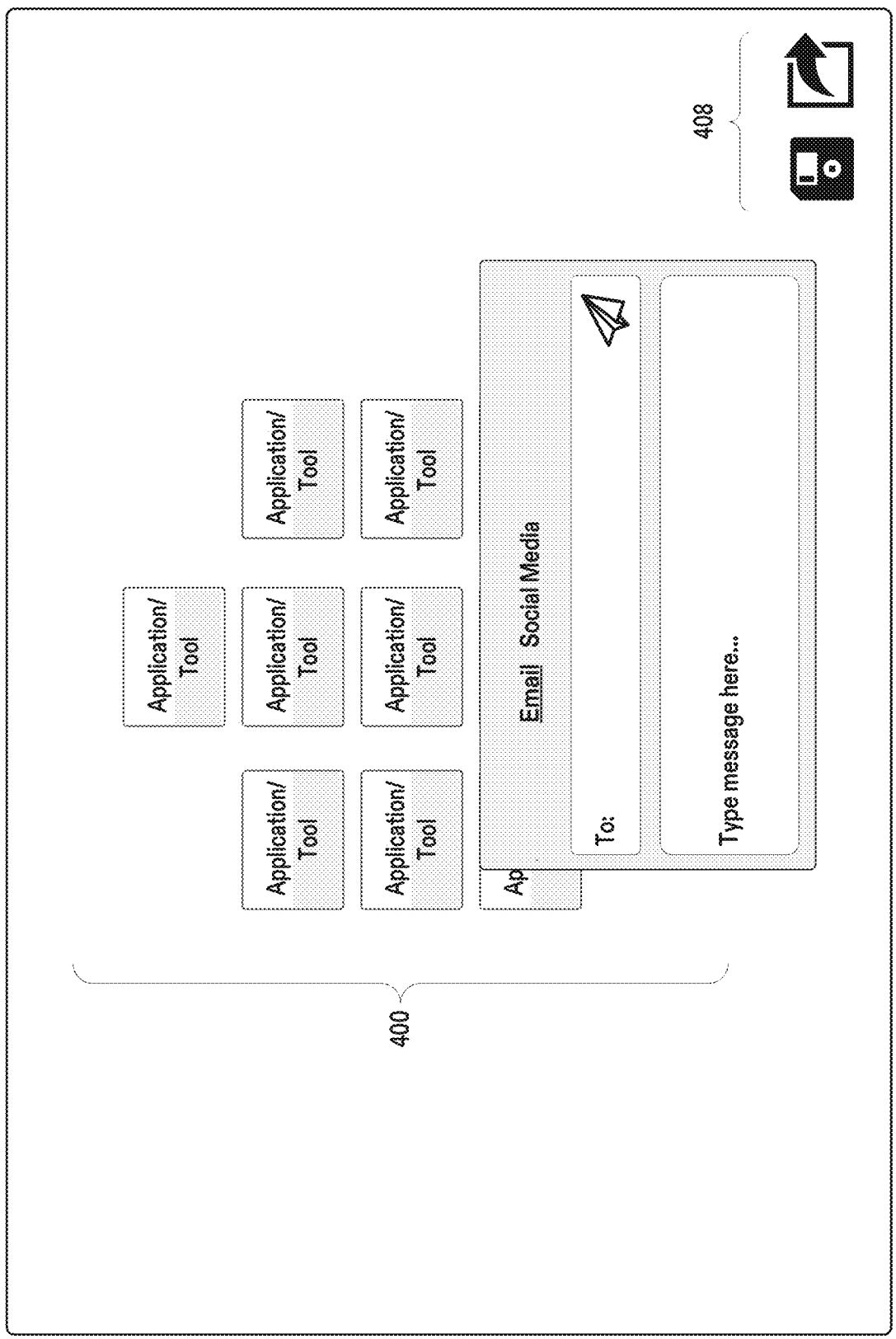
FIG. 11 shows a user interface for sharing a palette menu comprising a subset of a plurality of selectable software tools and applications, according to some embodiments.

FIG. 11 illustrates a user interface for sharing palette menu 400. The user interface may be, e.g., a pop-up window that is configured to be displayed in response to a user selection of a user control 408 for sharing palette menu 100. The user may be able to select a manner in which they wish to share palette menu 400. For example, the user interface may present the user with an option to share palette menu 400 via email or via a social media platform. After selecting their preferred avenue for sharing palette menu 400, the user may be prompted to enter contact information (e.g., an email address, a social media username, etc.) associated with the second user with whom they are sharing palette menu 400. The user interface may also allow the user to input a message for the second user that associated with the transmission of palette menu 400, for example a message describing a use case of palette menu 400.

Returning to FIG. 10, in some situations, the second user with whom the palette menu is shared may not have access to all of the software applications and tools included in the palette menu. For example, the second user may not have purchased or downloaded a software application or tool of the subset of software applications and tools included in the palette menu. In such cases, the software application or tool that is not accessible to the second user may be identified (step 1008), for instance by cross-referencing the names of the software applications and tools in the subset of software applications and tools that constitute the palette menu with the names of software applications and tools that are installed on the remote computer system. After identifying the inaccessible software application or tool, a course of action that may be taken by the second user to gain access to the inaccessible software application or tool may be visually indicated in the palette menu displayed on the remote computer system (step 1010). For example, an icon indicating that the user needs to purchase the inaccessible software application or tool may be displayed in a vicinity of the inaccessible software application or tool. In some embodiments, the second user can execute the course of action for gaining access to the inaccessible software application or tool by interacting with the visual indication of the course of action.

In addition to being modified by a user (e.g., using method 500 shown in FIG. 5), a palette menu may be updated automatically based on the user's recent activities. If, for example, the stops working on a first project in a software environment associated with the plurality of software applications and tools and begins working on a second, unrelated project (e.g., a project that involves files of a different file type than those used in the first project), the palette menu that is displayed to the user may be automatically modified to provide the user with software applications and tools that are most relevant to the second project.

Figure 12:
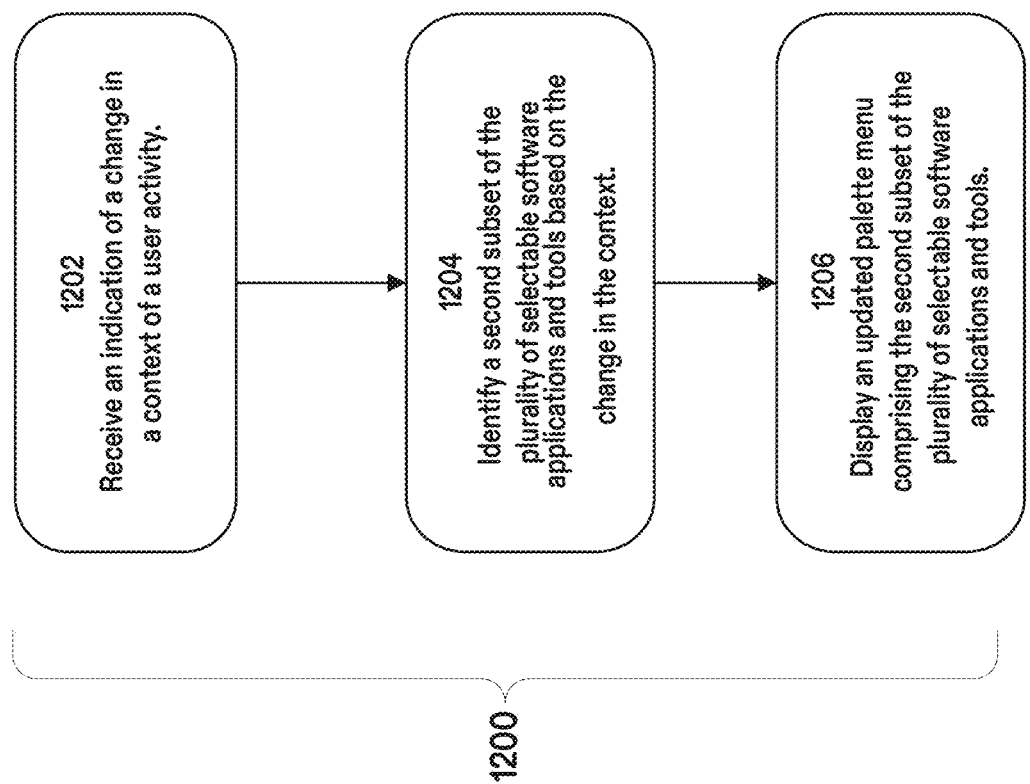
FIG. 12 shows a method for updating a palette menu based on user activity context, according to some embodiments.

FIG. 12 provides a method 1200 for modifying a palette menu based on a user's recent activities. Method 1200 may be performed, for example, using one or more electronic devices implementing a software platform. In some examples, method 1200 is performed using a client-server system, and the blocks of method 1200 are divided up in any manner between the server and a client device. In other examples, the blocks of method 1200 are divided up between the server and multiple client devices. In other examples, method 1200 is performed using only a client device or only multiple client devices. In method 1200, some blocks are, optionally, combined, the order of some blocks is, optionally, changed, and some blocks are, optionally, omitted. In some examples, additional steps may be performed in combination with the method 1200. In some examples, one or more blocks of method 1200 are reordered. Accordingly, the operations as illustrated (and described in greater detail below) are exemplary by nature and, as such, should not be viewed as limiting.

Prior to the initiation of method 1200, a palette menu comprising a subset of the plurality of software applications and tools may be displayed for the user. In a first step 1202, an indication of a change in a context of a user activity may be received. An indication of a change in the context of the user activity may be determined based on the position of the user's cursor, the information (e.g., files) visible to the user on the user's computer screen, updates to the user's profile that is associated with a software environment, a selection by the user of, e.g., a file to edit or view, or any other suitable indication of the user's activity in the software environment. For example, an indication of a change in the context of the user activity may be data indicating that the user has closed a file associated with a first project and opened a file associated with a second project.

A second subset of the plurality of software applications and tools may be identified based on the indicated change in the context (step 1206). In some embodiments, the second subset of the plurality of software applications may be identified by mapping the data associated with the change in the context of the user activity to one or more of the software tools and applications. Additionally or alternatively, one or more trained machine learning models may be used to identify the second subset of the plurality of software applications and tools. For example, if the indication of the change in the context of the user activity comprises text data, then a machine learning model trained for text analysis (e.g., a natural language processor) may be applied to the text data to extract keywords, key entities, key phrases, etc. The extracted or analyzed portions of the text data may provide context to, e.g., the user's current actions in the software environment. Similarly, if the indication of the change in the context of the user activity comprises image data, then a machine learning model trained for image analysis (e.g., a computer vision model) may be applied to the image data to extract objects, people, locations, or activities depicted in the image data. The extracted or analyzed portions of the image data may contextualize the user's current actions in the software environment. Other suitable analyses can also be performed depending on the data that indicates the change in the context, for example audio analyses. After the user's current actions have been contextualized, the identified context may be used to determine the second subset of applications and tools.

If the indication of the change of the context comprises the entirety of a data file, then the entirety of said data file may be analyzed (e.g., using machine learning models) to determine or characterize the context of the user's current actions in the software environment. In some embodiments, however, the indication of the change in the context may be based on the user's current field of view in the software environment (e.g., the data that the user can see on their screen). In such cases, only the data that is visible to the user may be analyzed to determine or characterize the context of the user's current actions in the software environment.

In some embodiments, a first tool or application may be identified for the second subset of applications and tools by comparing, e.g., identified keywords in text data or identified objects in image data to the representative digital objects (e.g., metadata) associated with the plurality of software tools and applications. Once the first tool or application has been identified, additional tools and applications for the second subset may be identified by determining applications or tools with associated embeddings that are similar to embeddings associated with the first tool or application. Tools and applications used by other users in contexts similar to the identified user context may also be provided in the second subset of tools and applications. After the second subset of the plurality of software applications and tools has been identified, an updated palette menu comprising the second subset of the plurality of software applications and tools may then be displayed (step 1206).

Example—Context-Based Palette Menu Updates

The plurality of tools and applications may be associated with a software environment for viewing, organizing, and editing files, including image files, text files, audio files, and video files. A user of the software environment may begin a project in which they are working with files associated with a certain topic. Data associated with the topic of the project may be acquired, for example information contained in the project files. This data may be extracted from the project files using trained machine learning models, for example natural language processors or computer vision models. In addition, data about the file types included in the project files as well as data about the user may be acquired. The acquired data may indicate a change in the context of the user's activities in the software environment.

The data that indicates the change in the context of the user's activities may be used to identify software tools and applications of the plurality of software tools and applications that are most relevant to the user's project. Some relevant software tools and applications may be identified based on data acquired from other users of the software environment. For example, if other users of the software environment have used a certain subset of the software tools and applications for projects that are, e.g., similar in topic or scope to the user's current project or have used a certain subset of the software applications and tools in conjunction with file of similar types to the project files, then that subset of software applications and tools may be identified. Other relevant software tools and applications may be identified based on the types of files that make up the project files by, e.g., filtering embeddings associated with the plurality of software tools and applications based on the file types to which the software tools and applications can be applied. The software tools and applications that are identified as being potentially relevant to the user may be displayed as a palette menu for the user.

The user's context-based palette menu may update automatically as the user interacts with the software environment. If, for instance, the user switches their focus from a text file to an image file (which may be indicated, e.g., by the user closing the text file and opening the image file, or by the user moving their cursor from the text file to the image file), then applications and tools related to text files may be automatically removed from the palette menu and applications and tools related to image files may be automatically added to the palette menu.

Figure 13A:
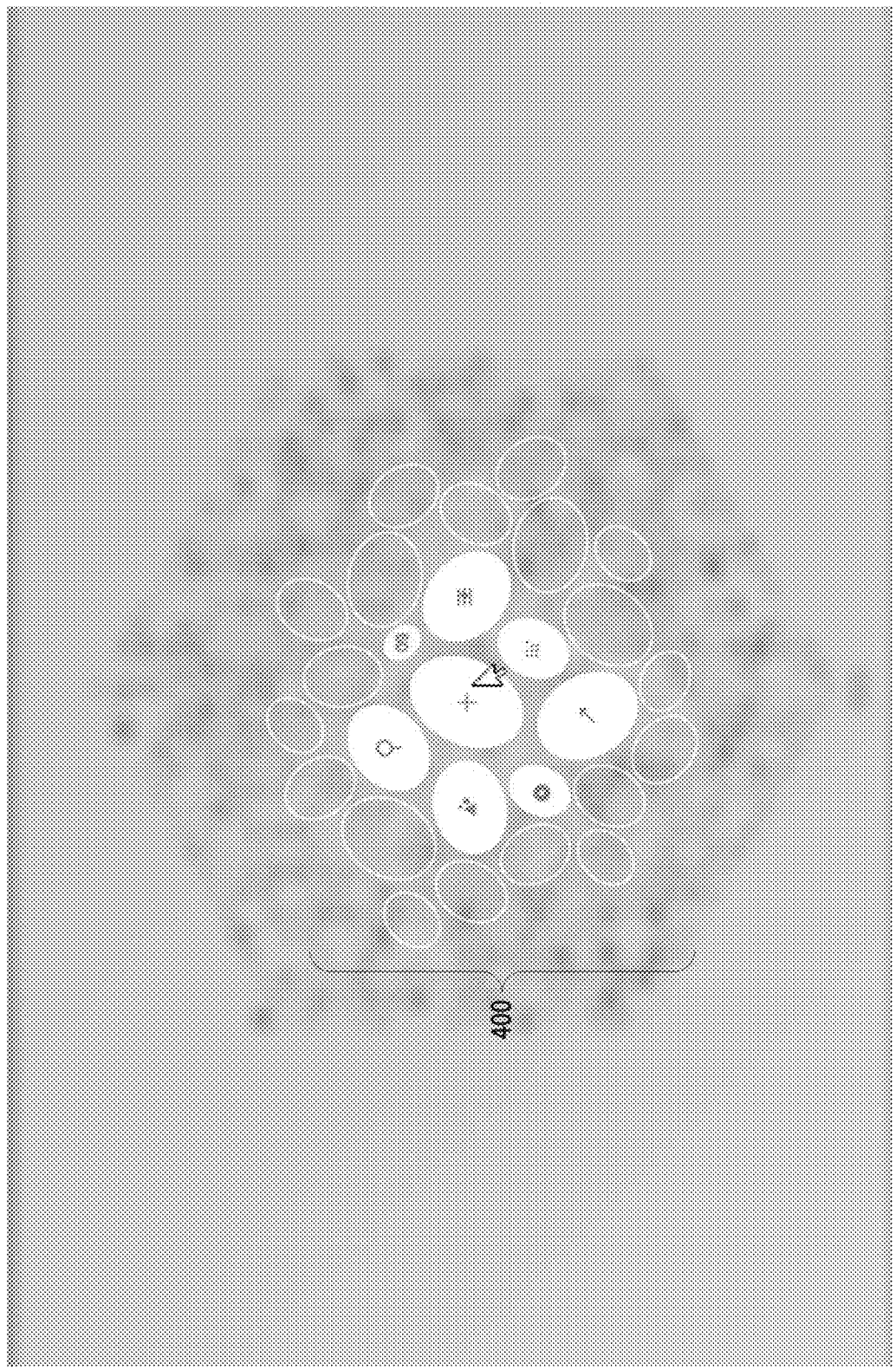
FIG. 13A shows a screenshot of an example palette menu.
Figure 13B:
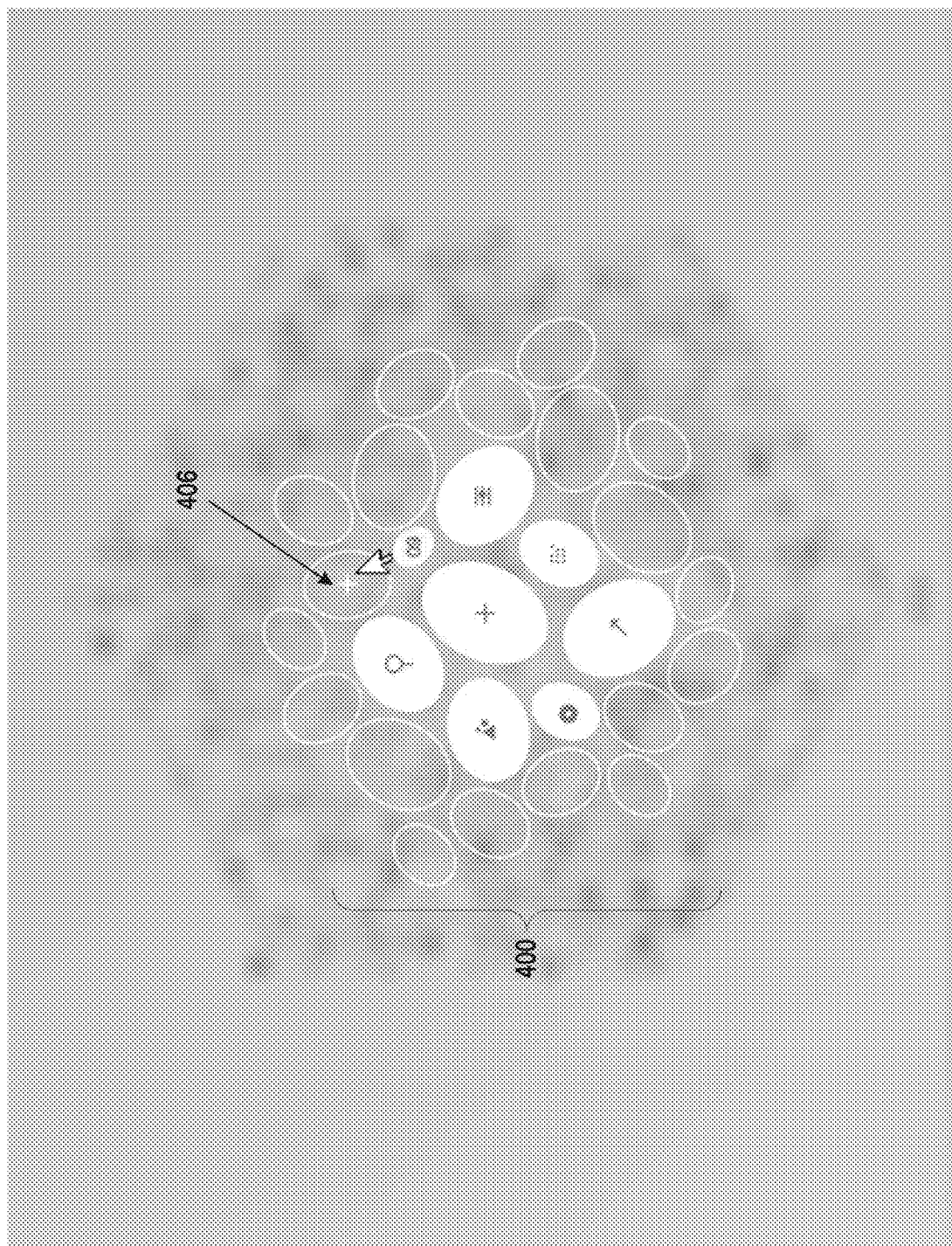
FIG. 13B shows a screenshot of a palette menu with an example user control that allows a user to modify the palette menu.
Figure 13C:
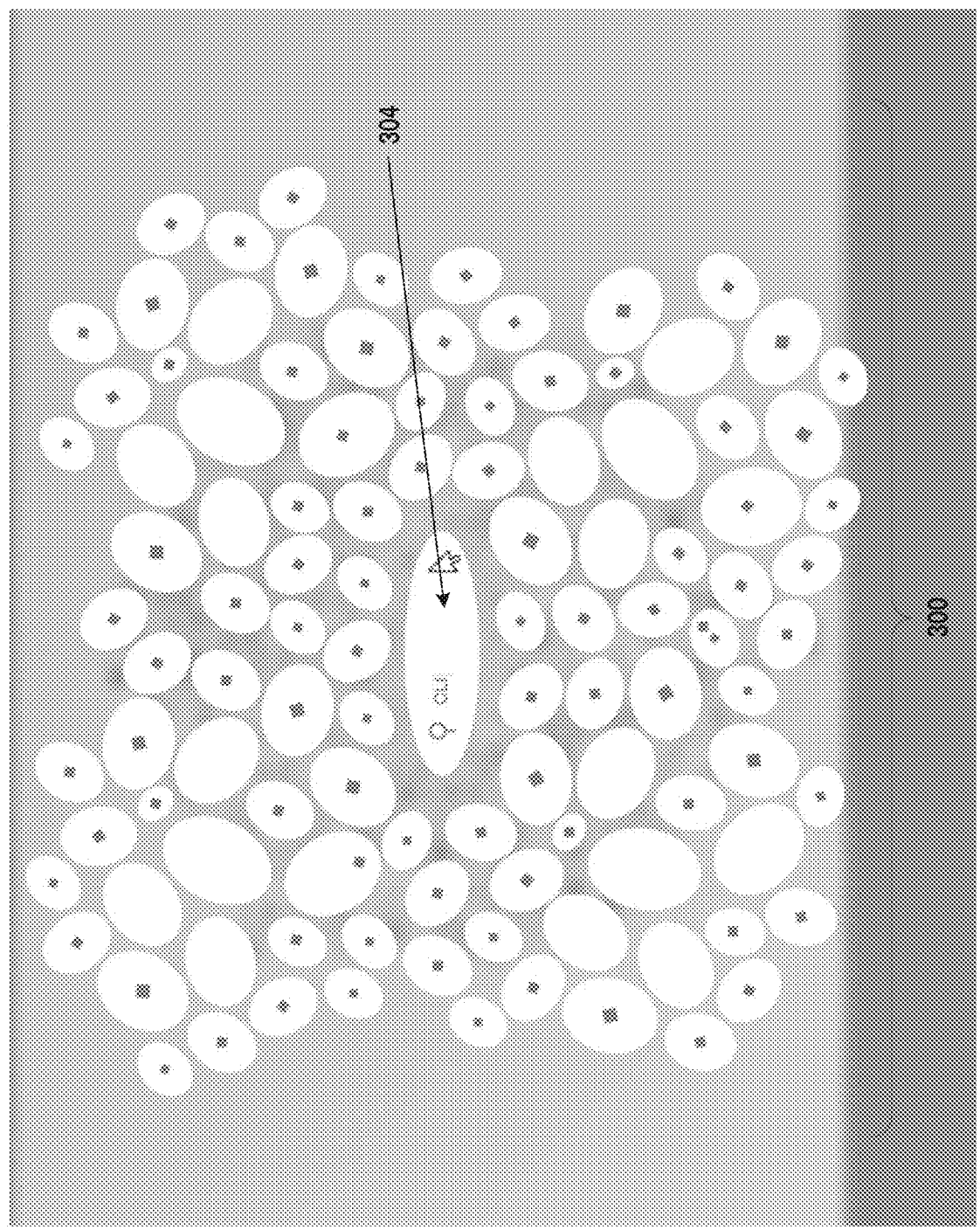
FIG. 13C shows a screenshot of a plurality of selectable software tools and applications displayed in response to a user request to modify a palette menu.
Figure 13D:
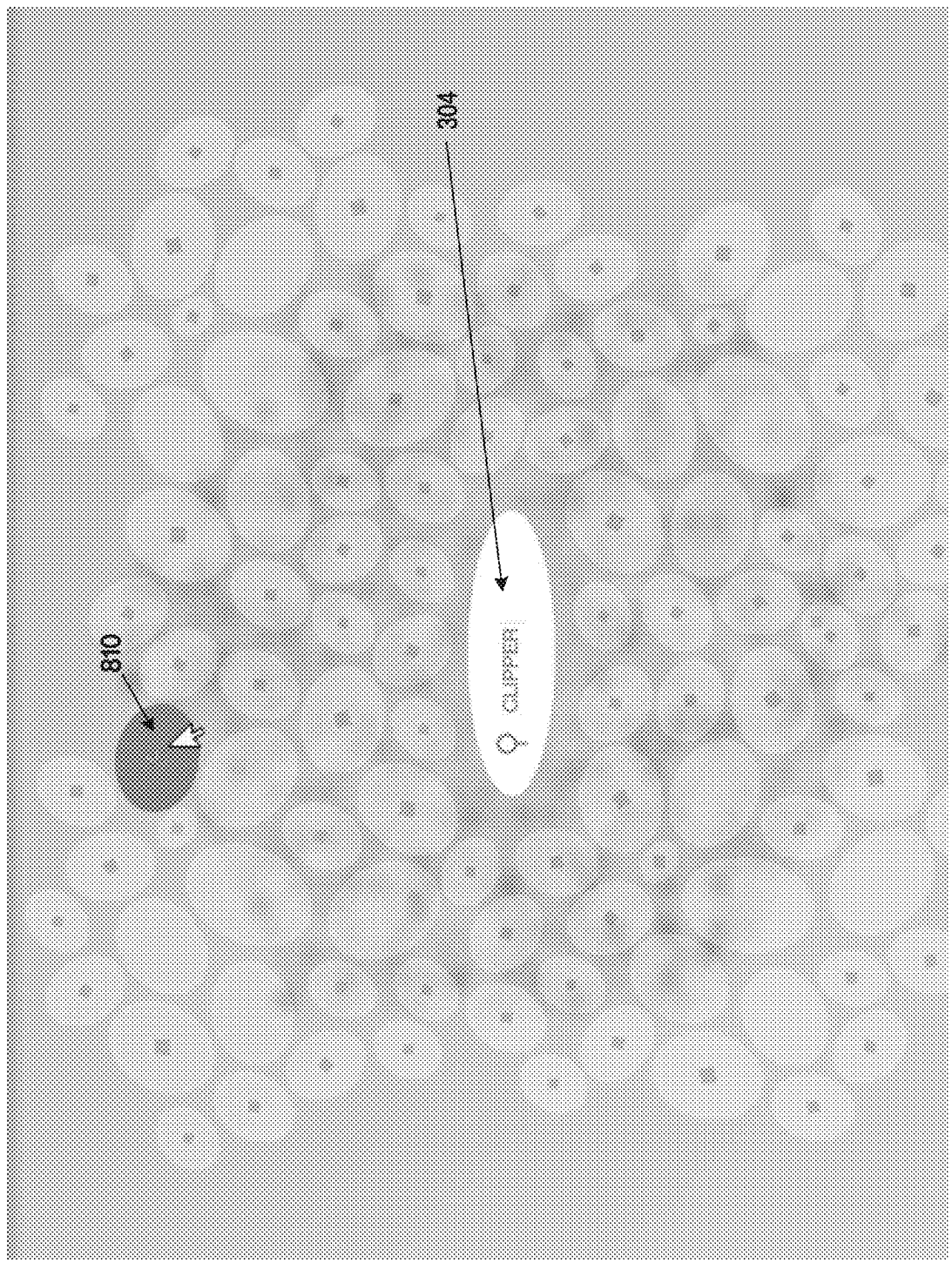
FIG. 13D shows a screenshot of a plurality of selectable software tools and applications displayed in response to a search query and a user selection of a software tool or application.
Figure 13E:
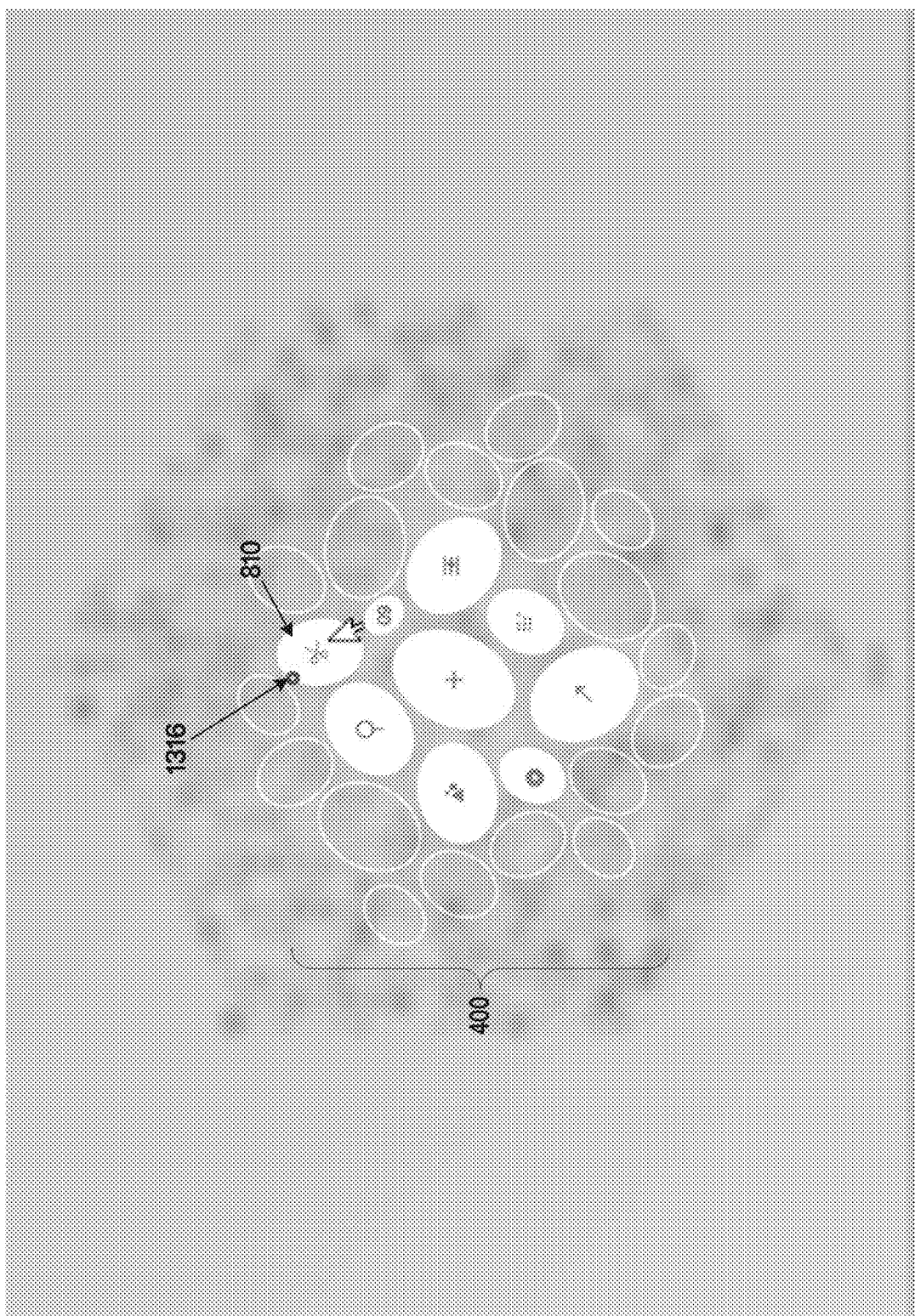
FIG. 13E shows a screenshot of an updated palette menu.

FIGS. 13A-13F show various screenshots of an example plurality of selectable software applications and tools 300 displayed using the provided techniques (e.g., method 100) and an example palette menu 400 comprising a subset of the plurality of selectable software applications and tools. Specifically, FIG. 13A shows a screenshot of an example palette menu 400; FIG. 13B shows a screenshot of a user control 406 for adding new software applications and tools to palette menu 400; FIG. 13C shows a screenshot of the plurality of selectable software applications and tools 300 that may be displayed in response to a user selection of user control 406 shown in FIG. 13B; FIG. 13D shows a screenshot of a software application or tool 810 displayed in response to a search query received via a search control 304; and FIG. 13E shows a modified palette menu 400 that includes software application or tool 810 and provides a user control 1316 for removing software application 810.

Figure 13F:
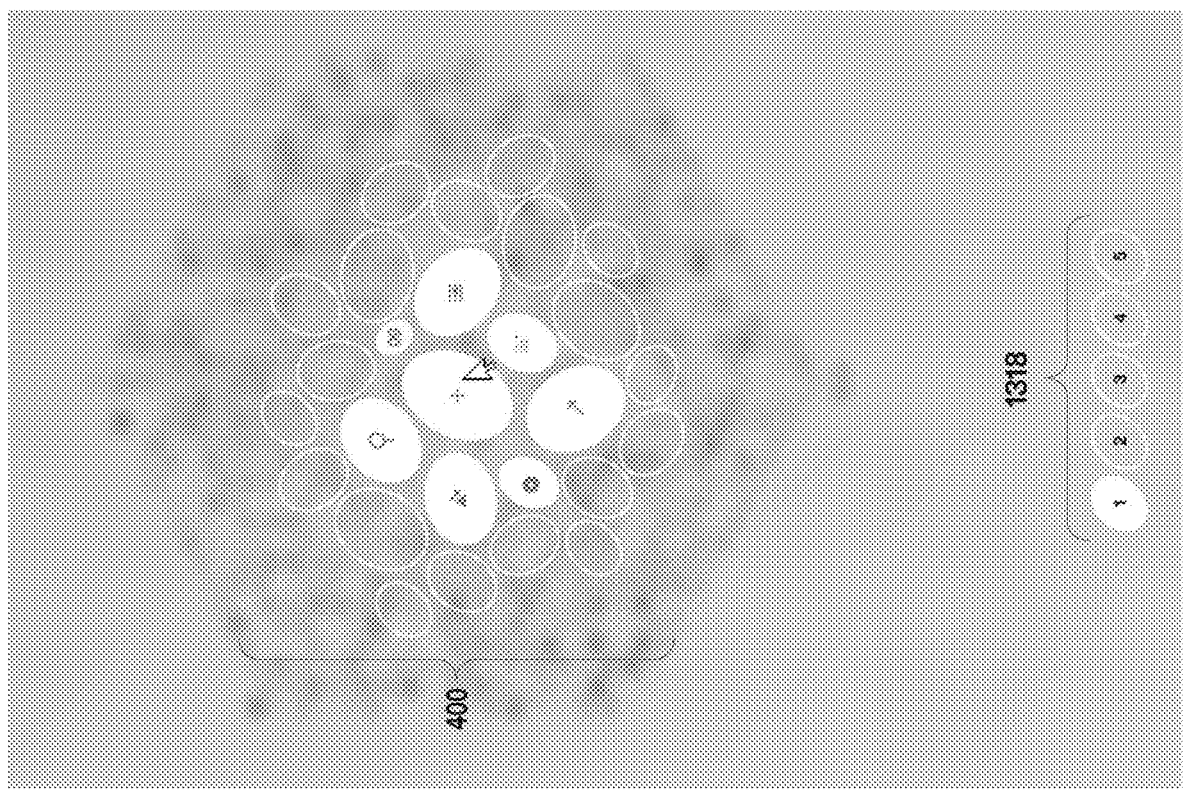
FIG. 13F shows a screenshot of a user interface for navigating between a plurality of saved palette menus.

FIG. 13F shows a screenshot of a user interface for toggling between a plurality of saved palette menus. The user interface may include a plurality of user controls 1318, each of which may be associated with a saved palette menu. To navigate to a specific palette menu, the user may interact with (e.g., select) the user control that corresponds to that palette menu.

Figure 14:
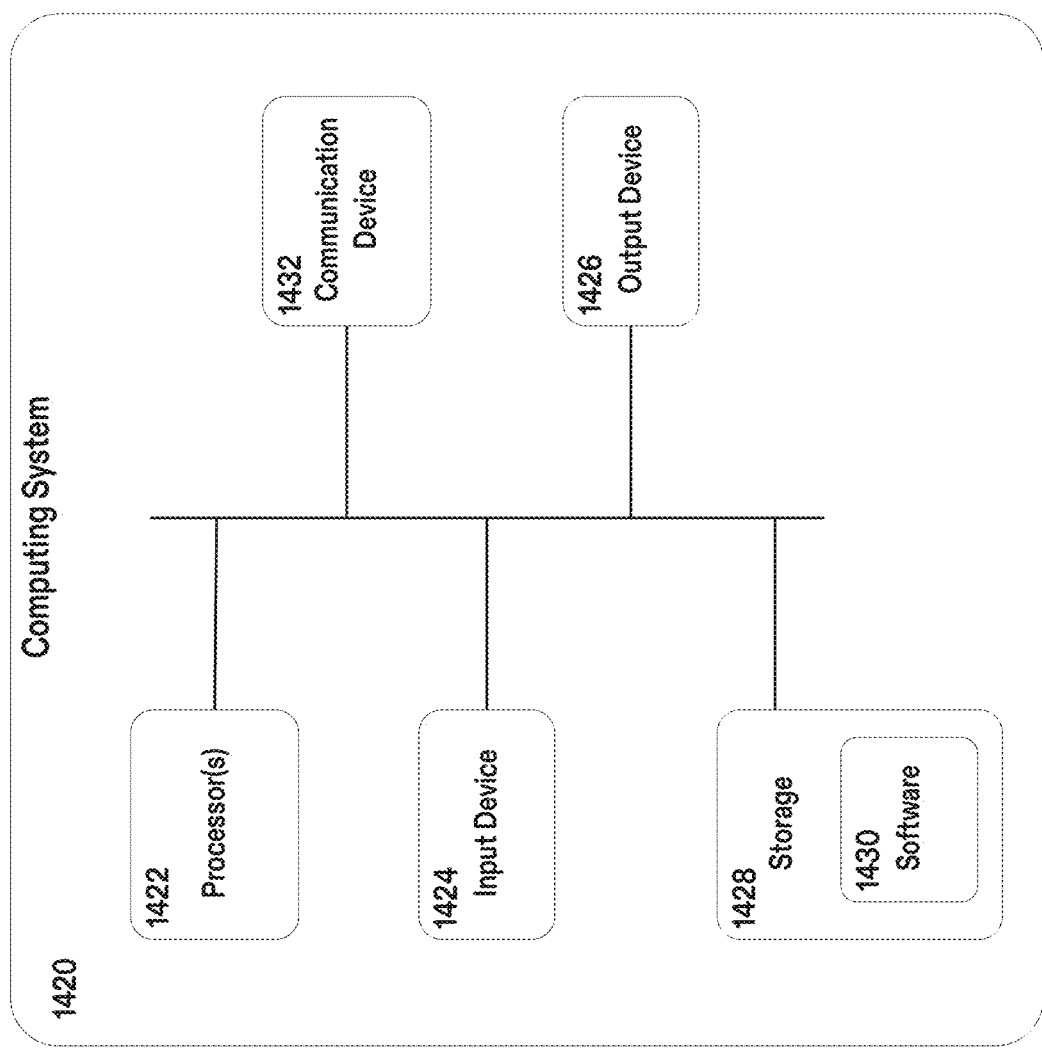
FIG. 14 shows an exemplary computer system, according to some embodiments.

FIG. 14 shows an exemplary computer system 1420 that can be used to execute the described methods (e.g., method 100) for organizing a plurality of selectable software applications and tools. Computer system 1420 can be any suitable type of microprocessor-based device, such as a personal computer, workstation, server, or handheld computing device (portable electronic device) such as a phone or tablet, or dedicated device. As shown in FIG. 14, computer system 1420 may include one or more classical (binary) processors 1422, an input device 1424, an output device 1426, storage 1428, and a communication device 1432.

Input device 1424 and output device 1426 can be connectable or integrated with system 102. Input device 1424 may be any suitable device that provides input, such as a touch screen, keyboard or keypad, mouse, or voice-recognition device. Likewise, output device 1426 can be any suitable device that provides output, such as a display, touch screen, haptics device, or speaker.

Storage 1428 can be any suitable device that provides (classical) storage, such as an electrical, magnetic, or optical memory, including a RAM, cache, hard drive, removable storage disk, or other non-transitory computer readable medium. Communication device 1432 can include any suitable device capable of transmitting and receiving signals over a network, such as a network interface chip or device. The components of computer system 1420 can be connected in any suitable manner, such as via a physical bus or via a wireless network.

Processor(s) 1422 may be or comprise any suitable classical processor or combination of classical processors, including any of, or any combination of, a central processing unit (CPU), a field programmable gate array (FPGA), and an application-specific integrated circuit (ASIC). Software 1430, which can be stored in storage 1428 and executed by processor(s) 1422, can include, for example, the programming that embodies the functionality of the present disclosure. Software 1430 may be stored and/or transported within any non-transitory computer-readable storage medium for use by or in connection with an instruction execution system, apparatus, or device that can fetch instructions associated with the software from the instruction execution system, apparatus, or device and execute the instructions. In the context of this disclosure, a computer-readable storage medium can be any medium, such as storage 1428, that can contain or store programming for use by or in connection with an instruction execution system, apparatus, or device.

Software 1430 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computer system 1420 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer system 1420 can implement any operating system suitable for operating on the network. Software 1430 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

As used herein, the singular forms "a", "an", and "the" include the plural reference unless the context clearly dictates otherwise. Reference to "about" a value or parameter or "approximately" a value or parameter herein includes (and describes) variations that are directed to that value or parameter per se. For example, description referring to "about X" includes description of "X". It is understood that aspects and variations of the invention described herein include "consisting of" and/or "consisting essentially of" aspects and variations.

When a range of values or values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for organizing a plurality of selectable software applications and tools comprising:

receiving the plurality of selectable software applications and tools;

acquiring, for each software application or tool of the plurality of selectable software applications and tools, one or more representative digital objects associated with the respective software application or tool;

generating a plurality of embedding vectors by providing, for each software application or tool, the corresponding one or more representative digital objects to a trained machine learning model;

generating a visual layout of the plurality of selectable software applications and tools based on the plurality of embedding vectors; and displaying the plurality selectable software applications and tools in accordance with the visual layout.

2. The method of claim 1, further comprising displaying a palette menu comprising a subset of the plurality of selectable software applications and tools.

3. The method of claim 2, further comprising:

receiving a user request to modify the palette menu; and displaying the plurality of selectable software applications and tools in response to receiving the user request.

4. The method of claim 3, further comprising:

receiving a user selection of a software application or tool of the plurality of selectable software applications and tools from the displayed plurality of software applications and tools; and displaying an updated palette menu comprising an updated subset of the plurality of selectable software applications and tools, wherein the updated subset comprises the selected software application or tool.

5. The method of claim 2, further comprising:

receiving a user request to remove a software application or tool from the subset of the plurality of selectable software applications and tools in the palette menu;

displaying an updated palette menu comprising an updated subset of the plurality of selectable software applications and tools, wherein the updated subset does not include the removed software application or tool.

6. The method of claim 2, further comprising:

receiving an indication of a change in a context of user activity;

identifying a second subset of the plurality of selectable software applications and tools based on the change in the context;

displaying an updated palette menu comprising the second subset of the plurality of selectable software applications and tools.

7. The method of claim 6, wherein the indication of the change in the context of the user activity comprises an indication of a change in a file type being edited by the user, and wherein identifying the second subset of the plurality of selectable software applications and tools comprises identifying software applications and tools associated with the file type using the plurality of embedding vectors.

8. The method of claim 2, comprising:

receiving a user request to share the palette menu with a second user; and generating one or more datasets for the palette menu; and transmitting the one or more datasets to the second user, wherein the one or more datasets are used to generate and display the palette menu on a remote computer system.

9. The method of claim 8, wherein displaying the palette menu to the second user comprises:

identifying a software application or tool of the subset of selectable software applications and tools that is not accessible to the second user; and visually indicating a course of action for gaining access to the inaccessible software application or tool to the second user in the displayed palette menu.

10. The method of claim 2, wherein the palette menu is displayed in response to a user request.

11. The method of claim 10, wherein the user request is input using a custom keyboard shortcut, a custom computer mouse gesture, a custom stylus gesture, or a combination thereof.

12. The method of claim 1, wherein the one or more representative digital objects associated with each software application or tool of the plurality of software applications and tools comprise metadata associated with each software application or tool of the plurality of selectable software applications and tools.

13. The method of claim 12, wherein the one or more representative digital objects associated with each software application or tool of the plurality of software applications and tools comprise, for each software application or tool, a software program associated with the software application or tool.

14. The method of claim 1, wherein the one or more representative digital objects associated with each software application or tool of the plurality of selectable software applications and tools comprise, for each software application or tool, a visual icon representing the software application or tool.

15. The method of claim 1, wherein the one or more representative digital objects associated with each software application or tool of the plurality of selectable software applications and tools comprise, for each software application or tool, a textual description of the software application or tool.

16. The method of claim 1, further comprising:

receiving a search query from a user via a search control;

identifying a first software application or tool of the plurality of selectable software applications and tools that aligns with the search query based on metadata associated with the first software application or tool;

identifying one or more additional software applications or tools that align with the search query based on the plurality of embedding vectors; and displaying the first software application or tool and the one or more additional software applications or tools.

17. The method of claim 1, wherein generating the visual layout based on the plurality of embedding vectors comprises:

projecting each embedding vector of the plurality of embedding vectors into a two-dimensional vector space; and arranging the plurality of embedding vectors based on the projections of the plurality of embedding vectors.

18. The method of claim 1, wherein the plurality of software selectable software applications and tools comprises one or more selectable software applications and tools for editing text files, one or more selectable software applications and tools for editing image files, one or more selectable software applications and tools for editing audio files, one or more selectable software applications and tools for editing video files, one or more trained machine learning models, or combinations thereof.

19. A system for displaying a visual space comprising a plurality of selectable software applications and tools, the system comprising one or more processors configured to:

receive the plurality of selectable software applications and tools;

acquire, for each software application or tool of the plurality of selectable software applications and tools, one or more representative digital objects associated with the software application or tool;

generate a plurality of embedding vectors by providing, for each software application or tool, the corresponding one or more representative digital objects to a trained machine learning model;

generate a visual layout of the plurality of selectable software applications and tools based on the embedding vectors; and display the visual space comprising the plurality of selectable software applications and tools in accordance with the visual layout.

20. A non-transitory computer readable storage medium storing instructions for displaying a visual space comprising a plurality of selectable software applications and tools, wherein the instructions, when executed by one or more processors of a computer system, cause the computer system to:

receive the plurality of selectable software applications and tools;

acquire, for each software application or tool of the plurality of selectable software applications and tools, one or more representative digital objects associated with the software application or tool;

generate a plurality of embedding vectors by providing, for each software application or tool, the corresponding one or more representative digital objects to a trained machine learning model;

generate a visual layout of the plurality of selectable software applications and tools based on the embedding vectors; and display the visual space comprising the plurality of selectable software applications and tools in accordance with the visual layout.

\* \* \* \* \*